United States Patent
Jones et al.

(10) Patent No.: US 12,164,133 B2
(45) Date of Patent: Dec. 10, 2024

(54) LOW-PROFILE COLOR-MIXING LIGHTPIPE

(71) Applicant: Fraen Corporation, Reading, MA (US)

(72) Inventors: Carlton Jones, Boxford, MA (US); Renald Dore, Somerville, MA (US)

(73) Assignee: Fraen Corporation, Reading, MA (US)

( * ) Notice: Subject to any disclaimer, the term of this patent is extended or adjusted under 35 U.S.C. 154(b) by 0 days.

(21) Appl. No.: 18/420,698

(22) Filed: Jan. 23, 2024

(65) Prior Publication Data
US 2024/0248245 A1  Jul. 25, 2024

Related U.S. Application Data

(63) Continuation-in-part of application No. 18/100,733, filed on Jan. 24, 2023, now abandoned.

(51) Int. Cl.
*F21V 8/00* (2006.01)

(52) U.S. Cl.
CPC .................... *G02B 6/001* (2013.01)

(58) Field of Classification Search
CPC .... G02B 6/0096; G02B 6/0031; G02B 6/005; G02B 6/0073
See application file for complete search history.

(56) References Cited

U.S. PATENT DOCUMENTS

| | | | |
|---|---|---|---|
| 2,540,839 A * | 2/1951 | Southworth | H01Q 21/06 343/778 |
| 3,752,561 A * | 8/1973 | Klemt | G02B 26/04 385/146 |
| 3,784,277 A | 1/1974 | Baker | |
| 5,271,077 A | 12/1993 | Brockman et al. | |
| 5,550,716 A | 8/1996 | Dassanayake et al. | |
| 6,056,426 A | 5/2000 | Jenkins | |
| 6,200,002 B1 | 3/2001 | Marshall et al. | |

(Continued)

FOREIGN PATENT DOCUMENTS

| | | | |
|---|---|---|---|
| CN | 1624578 A | 6/2005 | |
| CN | 1854884 A | 11/2006 | |

(Continued)

OTHER PUBLICATIONS

Anonymous: "TechSpec(™) Light Pipes Homogenize Non-Uniform Light Sources", Jul. 10, 2007 (Jul. 10, 2007), XP055263462, Retrieved from the Internet: URL:http://news.thomasnet.com/fullstory/light-pipes-homogenize-nonuniform-light-sources-523659, [retrieved on Apr. 6, 2016], 4 pages.

(Continued)

*Primary Examiner* — Fatima N Farokhrooz
(74) *Attorney, Agent, or Firm* — Potomac Law Group, PLLC; Reza Mollaaghababa; Reza Sadr

(57) ABSTRACT

In one aspect, a light pipe is disclosed, which comprises a curved light-guiding waveguide including an input surface configured to receive light and an output surface configured for the light to exit the curved light-guiding waveguide through the output surface; and a plurality of lateral surfaces extending from the input surface to the output surface, wherein an envelope of the curved light-guiding waveguide is generated by a rotation of the input surface around a rotational axis; and the rotational axis is collectively parallel to at most one of the plurality of lateral surfaces.

11 Claims, 31 Drawing Sheets

(56) References Cited

U.S. PATENT DOCUMENTS

| | | |
|---|---|---|
| 6,219,480 B1 | 4/2001 | Cassarly et al. |
| 6,341,876 B1 | 1/2002 | Moss et al. |
| 6,547,416 B2 | 4/2003 | Pashley et al. |
| 6,575,580 B2 | 6/2003 | Okamori et al. |
| 6,614,972 B1 | 9/2003 | Lundin |
| 6,819,505 B1 | 11/2004 | Cassarly et al. |
| 6,995,355 B2 | 2/2006 | Rains, Jr. et al. |
| 7,145,125 B2 | 12/2006 | May et al. |
| 7,349,163 B2 | 3/2008 | Angelini et al. |
| 7,581,862 B2 | 9/2009 | Stefanov et al. |
| 7,907,345 B2 | 3/2011 | Paulussen et al. |
| 8,246,210 B2 | 8/2012 | Angelini et al. |
| 8,482,226 B2 | 7/2013 | Vinther et al. |
| 9,243,760 B2 | 1/2016 | Niina et al. |
| 9,411,083 B2 | 8/2016 | Angelini et al. |
| 9,772,499 B2 | 9/2017 | Angelini et al. |
| 9,995,872 B2 | 6/2018 | Angelini et al. |
| 10,151,872 B2 | 12/2018 | Angelini et al. |
| 10,254,474 B2 | 4/2019 | Angelini et al. |
| 10,585,292 B2 | 3/2020 | Jones et al. |
| 11,156,847 B2 | 10/2021 | Jones et al. |
| 2002/0135869 A1 | 9/2002 | Banish et al. |
| 2005/0036203 A1 | 2/2005 | Ferri et al. |
| 2005/0168987 A1 | 8/2005 | Tamaoki et al. |
| 2005/0286123 A1 | 12/2005 | Abu-Ageel |
| 2006/0018031 A1 | 1/2006 | Takasugi |
| 2006/0039160 A1 | 2/2006 | Cassarly et al. |
| 2006/0044523 A1 | 3/2006 | Teijido et al. |
| 2006/0153518 A1 | 7/2006 | Abu-Ageel |
| 2006/0291206 A1 | 12/2006 | Angelini et al. |
| 2007/0024971 A1 | 2/2007 | Cassarly et al. |
| 2007/0126994 A1 | 6/2007 | Hwang |
| 2008/0030974 A1 | 2/2008 | Abu-Ageel |
| 2008/0068852 A1 | 3/2008 | Goihl |
| 2008/0239717 A1 | 10/2008 | Chen et al. |
| 2008/0273338 A1* | 11/2008 | Stefanov .............. G02B 6/0001 362/310 |
| 2009/0034278 A1 | 2/2009 | Tessnow et al. |
| 2009/0109698 A1 | 4/2009 | Koyata et al. |
| 2009/0185392 A1 | 7/2009 | Krupa et al. |
| 2010/0188018 A1 | 7/2010 | Salm |
| 2010/0226127 A1 | 9/2010 | Bigliatti et al. |
| 2011/0109445 A1 | 5/2011 | Weaver et al. |
| 2011/0199780 A1 | 8/2011 | Jak et al. |
| 2011/0267823 A1 | 11/2011 | Angelini et al. |
| 2012/0127710 A1 | 5/2012 | Jurik et al. |
| 2013/0039090 A1 | 2/2013 | Dau et al. |
| 2013/0155723 A1 | 6/2013 | Coleman |
| 2013/0258699 A1 | 10/2013 | Weaver |
| 2013/0294045 A1 | 11/2013 | Morgenbrod |
| 2013/0301291 A1 | 11/2013 | Lavizzari |
| 2014/0286032 A1 | 9/2014 | Fedosik et al. |
| 2014/0340927 A1 | 11/2014 | Johnston et al. |
| 2016/0091653 A1* | 3/2016 | Ban ....................... G02B 6/0043 362/613 |
| 2016/0370529 A1 | 12/2016 | Angelini et al. |
| 2016/0370533 A1 | 12/2016 | York et al. |
| 2017/0142314 A1 | 5/2017 | Moore et al. |
| 2017/0245746 A1 | 8/2017 | Komazaki et al. |
| 2017/0299955 A1 | 10/2017 | Kawamura et al. |
| 2017/0307805 A1 | 10/2017 | Wong |
| 2017/0351101 A1 | 12/2017 | Angelini et al. |
| 2018/0004356 A1 | 1/2018 | Sugiyama et al. |
| 2018/0024441 A1* | 1/2018 | Markle ................ G03B 21/208 355/71 |
| 2019/0033511 A1 | 1/2019 | Gobron et al. |
| 2019/0146148 A1 | 5/2019 | Angelini et al. |
| 2019/0278018 A1 | 9/2019 | Angelini et al. |
| 2020/0004033 A1 | 1/2020 | Jones et al. |

FOREIGN PATENT DOCUMENTS

| | | | |
|---|---|---|---|
| CN | 1979251 A | 6/2007 | |
| CN | 104541100 A | 4/2015 | |
| CN | 109073821 A | 12/2018 | |
| CZ | 2016601 A3 | 11/2017 | |
| DE | 102013011864 A1 | 2/2015 | |
| EP | 1398659 A2 | 3/2004 | |
| EP | 2211089 A1 | 7/2010 | |
| EP | 2211090 A1 | 7/2010 | |
| EP | 2669721 A1 * | 12/2013 | ............ F21S 43/237 |
| EP | 3588169 A1 | 1/2020 | |
| JP | 2004184612 A | 7/2004 | |
| JP | 2004311162 A * | 11/2004 | |
| JP | 3688708 B2 | 8/2005 | |
| JP | 2007012530 A | 1/2007 | |
| JP | 2007033831 A | 2/2007 | |
| TW | 201022575 A | 6/2010 | |
| WO | 2004032250 A1 | 4/2004 | |
| WO | 2010091097 A1 | 8/2010 | |
| WO | 2010113100 A1 | 10/2010 | |
| WO | WO-2012036541 A1 * | 3/2012 | ............. F21V 29/22 |
| WO | 2012122511 A1 | 9/2012 | |
| WO | 2013098387 A2 | 7/2013 | |
| WO | 2013149139 A1 | 10/2013 | |
| WO | 2017078771 A1 | 5/2017 | |

OTHER PUBLICATIONS

Application Brief 1-003. Light Guide Technologies; Using LED Lamps. Avago Technologies. Dec. 11, 2006: 22 pages.

European Examination Report, EP19182884.7, dated Feb. 17, 2023, 7 pages.

European Extended Search Report, EP19182884.7, dated Nov. 22, 2019, 10 pages.

International Search Report and Written Opinion mailed May 3, 2024 for International Patent Application No. PCT/US2024/012745.

Office Action received in Chinese Application No. 201280064730.7, dated Dec. 2, 2016; 16 pages.

PCT International Preliminary Report on Patentability and Written Opinion for PCT/EP2012/077043 dated Jul. 1, 2014 18 pages.

Renaissance Lighting Introduces evo(™) Solid State Product Line With Ed Series, Industry's First LED Downlight, https://www.ledsmagazine.com/company-newsfeed/article/16690010/renaissance-unveils-evo-solidstate-product-line, (May 9, 2006).

Third Party Observation submitted in corresponding European Application, EP12816673.3, dated Jan. 27, 2016, 5 pages.

Third Party Observation submitted in corresponding European Application, EP12816673.3, dated Oct. 27, 2017, 6 pages.

U.S. Appl. No. 13/729,459, filed Dec. 28, 2012, Marco Angelini et al.

U.S. Appl. No. 15/185,627, filed Jun. 17, 2016, Marco Angelini et al.

U.S. Appl. No. 15/200,843, filed Jul. 1, 2016, Marco Angelini et al.

U.S. Appl. No. 15/976,314, filed May 10, 2018, Marco Angelini et al.

U.S. Appl. No. 16/035,339, filed Jul. 13, 2018, Robert A. Gobron.

U.S. Appl. No. 16/156,620, filed Oct. 10, 2018, Marco Angelini et al.

U.S. Appl. No. 16/246, 127, filed Jan. 11, 2019, Marco Angelini et al.

U.S. Appl. No. 16/425, 158, filed May 29, 2019, Marco Angelini et al.

\* cited by examiner

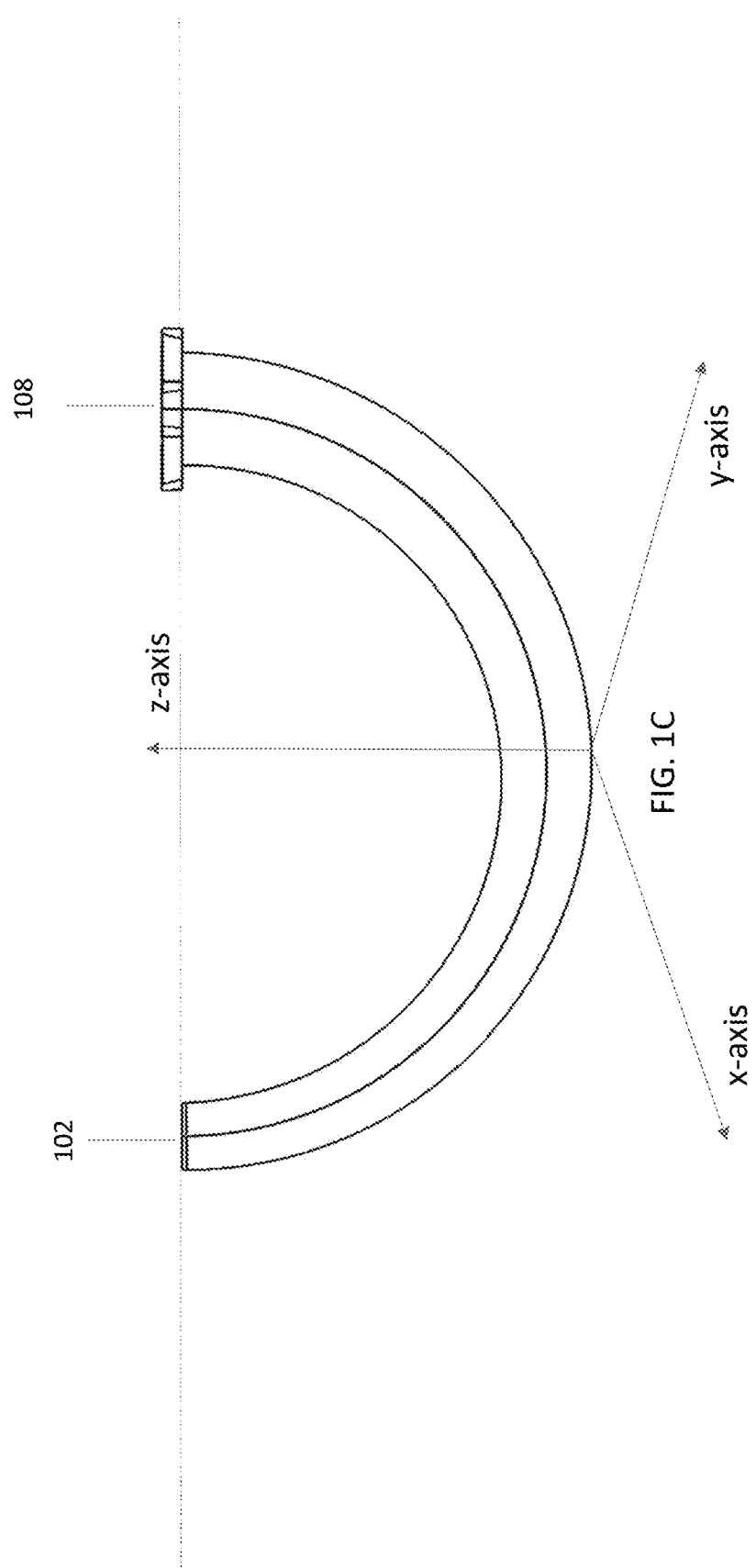

LOW-PROFILE COLOR-MIXING LIGHTPIPE

RELATED APPLICATIONS

The present application is a continuation-in-part of U.S. application Ser. No. 18/100,733, filed on Jan. 24, 2023, which is incorporated by reference herein in its entirety.

TECHNICAL FIELD

The present disclosure is directed generally to light mixing light pipes, e.g., for use in color mixing applications.

BACKGROUND

The present disclosure is generally directed to light pipes, and in particular, to light pipes that can be employed for light mixing.

A variety of light-mixing optical systems are available for mixing light from one or more light sources, e.g., solid-state light emitting diodes (LEDs). Many such light-mixing systems employ a light pipe that receives light at a proximal end and causes mixing of the light as the light advances along the light pipe. As the length of the light pipe increases, so does the effectiveness of the light mixing (color mixing) provided by the rod. However, an increase in the length of the light pipe can result in a concomitant increase in the height of an optical system in which the light pipe is incorporated. But many light-mixing applications require not only excellent light mixing but also a shorter system height.

SUMMARY

In one aspect, a light pipe is disclosed, which comprises a curved light-guiding waveguide segment having a generally rhombus transverse cross-sectional profile and extending from a proximal end for receiving light to a distal end through which the light exits the curved light-guiding waveguide segment, and an output light-guiding waveguide segment having at least a flared portion and extending from a proximal end configured to receive light from the distal end of the curved light-guiding waveguide segment to a distal end providing an output surface of the light pipe through which the light exits the light pipe.

In some embodiments, the curved light-guiding waveguide segment can be characterized by a single radius of curvature while in other embodiments, a plurality of radii of curvature may be needed for characterization of the curved light-guiding waveguide segment. By way of example, and without limitation, in some embodiments, the curved light-guiding waveguide segment may have a U-shaped profile. In other embodiments, the curved light-guiding waveguide segment may have a semi-circular profile.

In some embodiments, the flared portion of the output light-guiding waveguide segment exhibits an increasing cross-sectional area from the proximal end to the distal end of the flared portion. In some embodiments, the output surface of the light pipe is positioned at the distal end of the flared portion. In some embodiments, the flared portion is characterized by a draft angle that is equal to or less than about 20 degrees, e.g., in a range of about 1 degree to about 20 degrees, e.g., in a range of about 5 degrees to about 10 degrees. In some embodiments, the output light-guiding waveguide segment can include a straight section that extends to the flared portion, where the flared portion provides the output surface of the light pipe at its distal end.

In some embodiments, the light pipe comprises an input light-guiding waveguide segment extending from a proximal end providing an input surface of the light pipe for receiving light to a distal end through which light exits the input light-guiding waveguide segment to enter the curved light-guiding waveguide segment via the proximal end thereof.

Similar to the curved and the flared light-guiding waveguide segments, in various embodiments, the input light-guiding waveguide segment can have a generally rhombus transverse cross-sectional profile, that is, a putative projection of the light pipe onto a plane perpendicular to the general direction of the beam propagation forms a generally rhombus shape. In some embodiments, the input light-guiding waveguide segment can have a substantially uniform cross-sectional area from its proximal end to its distal end, that is, the input light-guiding waveguide segment can have an untapered profile, that is, the transverse cross-sectional area of the waveguide remains substantially constant from its proximal to its distal end. In other embodiments, the input light-guiding waveguide segment can include at least one flared portion characterized, e.g., by a draft angle equal to or less than about 20 degrees (e.g., in a range of about 1 degree to about 20 degrees).

In some embodiments, at least two, and generally all three light-guiding waveguide segments, of the light pipe are formed as an integral unit providing a unitary waveguide structure. For example, the curved light-guiding waveguide segment and any of (e.g., both of) the input and the output light-guiding waveguide segments can be formed as a single integral unit.

Alternatively, at least two of the light-guiding waveguide segments may be formed as separate units and can be coupled to one another using any suitable coupling method and mechanism, such as an adhesive, aligning the segments and mating the surfaces in-contact or close to contact with a holder or fixture, where the space between the mating surfaces may be either air or an index-of-refraction fluid.

In various embodiments, all of the input, curved and output light-guiding waveguide segments can have a generally rhombus transverse cross-sectional profile (shape).

In some embodiments, the input and the curved light-guiding waveguide segments can have a substantially uniform transverse cross-sectional area from one end thereof to the other end. In other embodiments, at least a portion, e.g., the entirety, of the input and/or the curved light-guiding waveguide segments can exhibit a flared (herein also referred to as tapered) longitudinal profile in which the transverse cross-sectional area of the waveguide changes, e.g., either continuously or in discrete steps, from its proximal end to its distal end.

In various embodiments, each of the light-guiding waveguide segments includes a plurality of lateral surfaces, which extend longitudinally between the two ends of the waveguide segment (where the end receiving the light is herein referred to as the proximal end and the end at which the light exits the waveguide segment is herein referred to as the distal end). The lateral surfaces can reflect at least a portion of the light incident thereon via total internal reflection (TIR) such that at least a portion of the light received by the waveguide segment advances along the waveguide segment via one or multiple total internal reflections at those surfaces. In some embodiments, a portion of the light entering a waveguide segment may pass through that segment without striking any of its lateral surfaces. By way of example, and without limitation, a portion of the light entering a straight input light-guiding waveguide segment may pass through that segment to be received by the curved light-guiding waveguide segment without striking any of the lateral surfaces of the input light-guiding waveguide segment. Any of the lateral surfaces of any of the light-guiding waveguide segments may be substantially flat or curved, e.g., along a direction extending from the proximal end of that segment to its distal end.

In some embodiments, the light pipe is configured such that its input and output surfaces are aligned such that the light pipe exhibits a vanishing net height. In other words, in such embodiments, the input and the output surfaces of the light pipe are positioned at the same level such that there is no offset between them.

In some embodiments, a single lens can be optically coupled to the output surface of the light pipe to shape the light exiting that output surface, e.g., to reduce the angular spread of the light exiting the output surface. By way of example, and without limitation, the lens can provide a positive optical power in a range of about 10 D to about 500 D, e.g., in a range of about 100 D to about 400 D, or any other sub-range.

In some embodiments, the output surface of the light pipe can be curved to function as a lens providing a positive or a negative optical power, e.g., an optical power in a range of about +/−10 D to about +/−500 D.

In some embodiments, the light pipe can include only a curved light-guiding waveguide segment and an output light-guiding waveguide segment, where the curved light-guiding waveguide segment provides a light input surface of the light pipe and the output light-guiding waveguide segment provides the light pipe's output surface.

In various embodiments, the light pipe can be formed of any of glass, an optical polymer, and silicone, all by way of example. While in some embodiments all of the light-guiding waveguide segments may be formed of the same material, in other embodiments, at least two of the light-guiding waveguide segments may be formed of different materials.

Further, some embodiments relate to a light pipe, including: a curved light-guiding waveguide including an input surface configured to receive light and an output surface configured for the light to exit the curved light-guiding waveguide through the output surface; and a plurality of lateral surfaces extending from the input surface to the output surface, wherein: an envelope of the curved light-guiding waveguide is generated by a rotation of the input surface around a rotational axis; and the rotational axis is collectively parallel to at most one of the plurality of lateral surfaces.

Some embodiments relate to a light pipe, wherein the rotational axis is parallel to none of the plurality of lateral surfaces.

Some embodiments relate to a light pipe, wherein: the rotation of the input surface around the rotational axis at a rotational angle forms the lateral surfaces; the rotational angle is 180 degrees; and the input surface after the rotation overlaps the output surface.

Some embodiments relate to a light pipe, wherein: the input surface defines a base plane; and the rotational axis is located on the base plane.

Some embodiments relate to a light pipe, wherein the output surface is located on the base plane.

Some embodiments relate to a light pipe, wherein the input surface has a plurality of sides forming a polygonal shape.

Some embodiments relate to a light pipe, wherein the polygonal shape is a square.

Some embodiments relate to a light pipe, wherein the polygonal shape is a non-square rhombus.

Some embodiments relate to a light pipe, wherein the polygonal shape is a hexagon.

Some embodiments relate to a light pipe, wherein the rotational axis is parallel to at most one of the plurality of sides of the input surface.

Some embodiments relate to a light pipe, wherein the rotational axis is parallel to none of the plurality of sides of the input surface.

Some embodiments relate to a light pipe, wherein the rotational axis is angled at 45 degrees with respect to at least one of the plurality of sides of the input surface.

Some embodiments relate to a light pipe, wherein: two sides of the plurality of sides of the input surface are parallel; and the rotational axis is angled at 45 degrees with respect to the two sides of the plurality of sides.

Some embodiments relate to a light pipe, including: a curved light-guiding waveguide extending from an input surface configured to receive light to an output surface configured for the light to exit the curved light-guiding waveguide through the output surface; wherein: the input surface has a plurality of sides forming a polygonal shape; an envelope of a portion of the curved light-guiding waveguide is generated by a rotation of the input surface around a rotational axis; and the rotational axis is parallel to at most one of the plurality of sides of the input surface.

Some embodiments relate to a light pipe, wherein the rotational axis is parallel to none of the plurality of sides of the input surface.

Some embodiments relate to a light pipe, wherein the rotational axis is angled at 45 degrees with respect to at least one of the plurality of sides of the input surface.

Some embodiments relate to a light pipe, wherein: two sides of the plurality of sides of the input surface are parallel; and the rotational axis is angled at 45 degrees with respect to the two sides of the plurality of sides.

Some embodiments relate to a light pipe, wherein: the rotation of the input surface around the rotational axis at a rotational angle forms the lateral surfaces; the rotational angle is 180 degrees; and the input surface after the rotation overlaps the output surface.

Some embodiments relate to a light pipe, wherein: the input surface defines a base plane; and the rotational axis is located on the base plane.

Some embodiments relate to a light pipe, wherein the output surface is located on the base plane.

Further understanding of various aspects of the present teachings can be obtained by reference to the following detailed description in conjunction with the associated drawings, which are described briefly below.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several embodiments consistent with the disclosure. Together with the description, the drawings serve to explain the principles of the disclosure.

In the drawings.

DETAILED DESCRIPTION

Figure 1A:
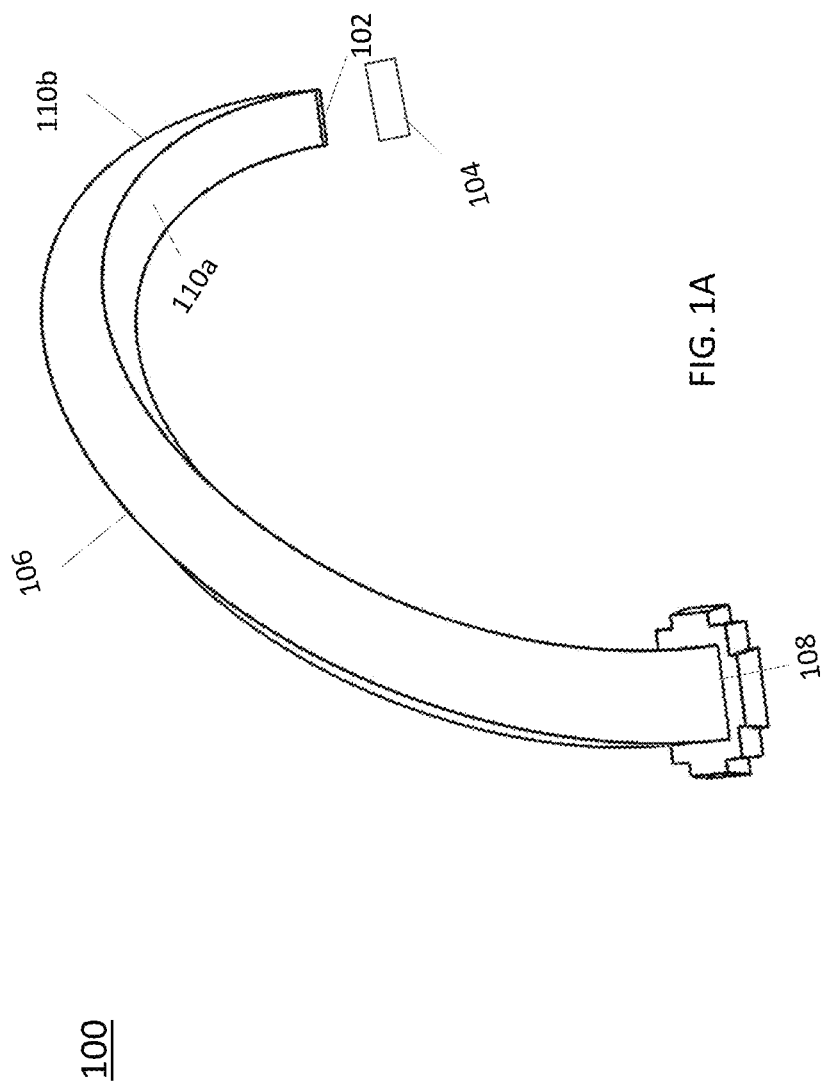
FIG. 1A is a schematic perspective view of a light pipe according to an embodiment of the present teachings.
Figure 1B:
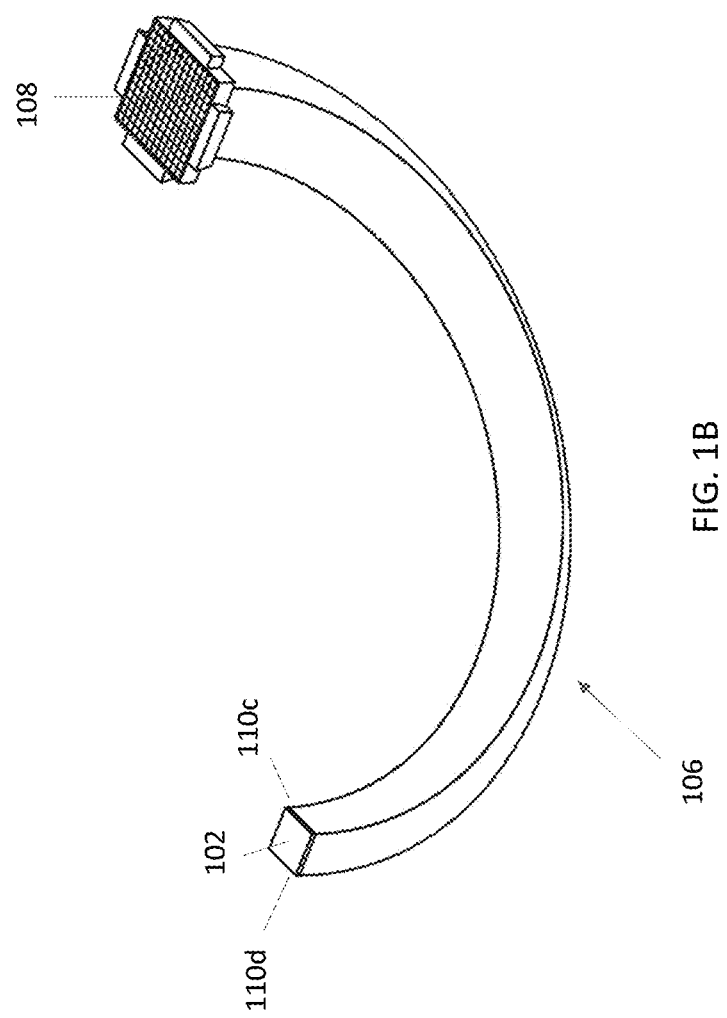
FIG. 1B is another schematic perspective view of the light pipe depicted in FIG. 1A, FIG. 1C schematically depicts a vertical offset between the light input and the light output surfaces of the light pipe depicted in FIG. 1A.

The following detailed description refers to the accompanying drawings. The same or similar reference numbers may have been used in the drawings or in the description to refer to the same or similar parts. Also, similarly named elements may perform similar functions and may be similarly designed, unless specified otherwise. Details are set forth to provide an understanding of the exemplary embodiments. Embodiments, e.g., alternative embodiments, may be practiced without some of these details. In other instances, well known techniques, procedures, and components have not been described in detail to avoid obscuring the described embodiments.

The present disclosure is generally related to light pipes that provide efficient light mixing, e.g., for use in color mixing applications, with a low net height. In various embodiments, a light pipe according to the present teachings can provide an output light beam exhibiting a beam quality comparable to that achievable using light pipes having significantly greater net heights.

Various terms are used herein according to their ordinary meanings in the art. The phrase "general direction of propagation of a beam," or similar phrases are meant to convey the propagation direction of a central ray of a bundle of rays forming the beam. The phrase "transverse cross section" of a light pipe or similar phrases as used herein refer to a cross section of the light pipe in a plane that is substantially perpendicular to the general direction of propagation of a light beam through the light pipe. The term "generally rhombus profile" refers to a quadrilateral shape having two acute angles and two obtuse angles. While in a perfect rhombus profile the four sides are equal and the two opposed acute angles and two opposed obtuse angles are also equal, a generally rhombus profile encompasses not only a perfect rhombus profile but also profiles in which at least two sides can have different lengths and/or the two acute and/or the obtuse angles can be different. Further, in some generally rhombus profiles, at least one side can be curved, rather than being straight.

The terms "an effective height of a light pipe" and "a net height of a light pipe" are used herein interchangeably to refer to the shortest distance between two putative planes, one of which would be parallel to and in contact with an input surface of the light pipe and the other would be parallel to and in contact with an output surface of the light pipe. When the two putative planes are parallel to one another, the shortest distance will be a length of a line segment extending between the two planes and perpendicular at each end to one of the planes.

The term "a nominal length of a light pipe" refers to the shortest distance between the input and the output surfaces of the light pipe along a path internal to the light pipe. The term "longitudinal" refers to a direction extending from a proximal end (i.e., light-receiving end) to a distal end (i.e., an end at which light exits) of a waveguide segment or the light pipe as a whole.

The term "about" as used herein indicates a variation of at most 10% about a numerical value. The term "substantially" as used herein refers to a deviation, if any, of at most 10% from a complete state and/or condition.

With reference to FIGS. 1A, 1B, 1C, 1D, and 1E, a light pipe 100 according to an embodiment of the present teachings includes an input surface 102 (herein also referred to as a light-receiving surface) that can be optically coupled to a light source 104 to receive at least a portion of the light emitted by the light source. A variety of light sources can be employed for delivering light into the light pipe 100 via the light-receiving surface 102. By way of example, the light source 104 can be a multi-color light emitting device (LED), such as an RGBW LED, or a single-color LED or any other suitable coherent and incoherent light source.

The light pipe 100 further includes a curved light-guiding waveguide segment 106 that extends from the light-receiving surface 102 to an output surface 108 of the light pipe through which light can exit the light pipe. By way of example, in some embodiments, the light source can be positioned at a distance between about 0.2 mm to about 1 mm from the input surface, though any other suitable distance (or contact) of the light source with the light-receiving surface 102 may be employed. In this embodiment, a plurality of microlenses 101 are distributed over the output surface. In other embodiments, the output surface 108 may be flat with or without a lens coupled thereto. Further, in some embodiments, the output surface can be curved so that it would function as a lens, as discussed in more detail below.

The curvature of the light-guiding segment can vary, e.g., based on a particular application for which the light pipe is intended. By way of example, the curvature of the curved light-guiding segment can be in a range of about 10 mm to about 50 mm, though other curvatures may also be utilized. Further, while in some embodiments the curved light-guiding waveguide segment 106 can be characterized by a single curvature, in other embodiments the curvature of the curved light-guiding waveguide segment 106 may vary, either discretely or continuously, from the input surface to the output surface. Further, in some embodiments, the curved light-guiding segment can have a generally U-shaped profile.

Figure 1D:
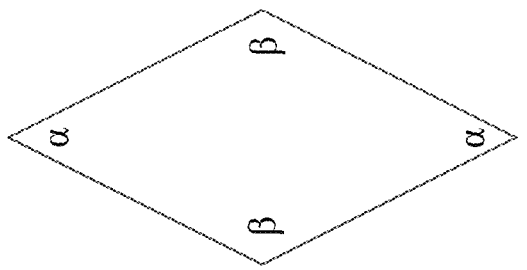
FIG. 1D is a schematic view of the rhombus transverse cross section of the light pipe depicted in FIG. 1A.

In this embodiment, the light-guiding waveguide segment 106 includes four lateral surfaces 110a, 110b, 110c, and 110d (which are herein collectively referred to as lateral surfaces 110) that are arranged relative to one another such that the light-guiding segment 106 exhibits a rhombus transverse cross-sectional profile characterized by four equal sides arranged relative to one another to form two equal and opposed acute angles (a) and two equal and opposed obtuse angles (B) (See, FIG. 1D).

Figure 1E:
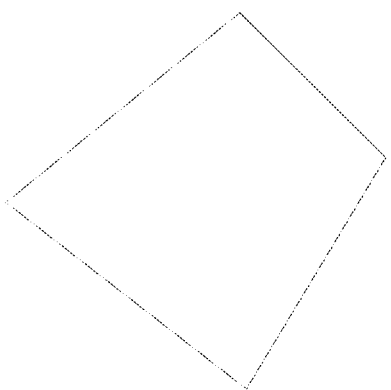
FIG. 1E is a schematic view of a generally rhombus profile, which deviates from a perfect rhombus profile and can be used as the transverse cross-sectional profile of light pipes according to certain embodiments of the present teachings, FIG. 1F schematically depicts a definition associated with a net height and a nominal length of a light pipe according to an embodiment.

In other embodiments, the light-guiding segment may exhibit a modified rhombus profile (herein also referred to as a generally rhombus profile or generally rhombus shape, as noted above) that deviates from a perfect rhombus profile, e.g., a profile in which at least two of the lateral sides are not equal and/or any of the pair of acute and obtuse angles are not equal. By way of example, FIG. 1E schematically depicts an example of a generally rhombus profile, which deviates from a perfect rhombus profile.

In other examples, a generally rhombus profile may include at least one side having a length that is different from the length of one or more other sides of the rhombus. Further, in some embodiments, one or more lateral surfaces of the light pipe may be curved and/or exhibit undulations leading to a generally rhombus profile in which at least one of the sides is not straight.

In this embodiment, the light pipe 100 exhibits a continuously varying taper from the input surface 102 to the output surface 108, which results in an increase in the transverse cross-sectional area of the light pipe from the input surface to the output surface. By way of example, in some embodiments, the taper of the light pipe may be characterized by a draft angle equal to or less than about 20°, e.g., a draft angle in a range of about 1° to about 20°.

In this embodiment, the lateral surfaces of the light-guiding waveguide segment are substantially flat and are configured to reflect at least a portion of the received light incident thereon via total internal reflection (TIR). Thus, at least a portion of the light rays entering the light-guiding segment can undergo one or multiple total internal reflections at these lateral surfaces and advance along the light-guiding segment to reach the output surface of the light-guiding segment through which those light rays exit the light-guiding segment.

In this embodiment, the input and the output surfaces are offset relative to one another such that the light pipe exhibits a non-zero net height. By way of example, with respect to FIG. 1C, such an offset of the input and the output surfaces of the light pipe can be illustrated using a Cartesian coordinate system with the origin at the bottom point of the curved light-guiding segment with the z-axis perpendicular to the bottom surface. The offset (herein also referred to as a "vertical offset") is defined as the difference in the z-axis positions of the input and the output surfaces. In various embodiments, such an offset can correspond to the net height of the light pipe.

As discussed in more detail below, in other embodiments, the input and the output surfaces of the light pipe can be at the same level such that the light pipe exhibits a zero net height.

Figure 1F:
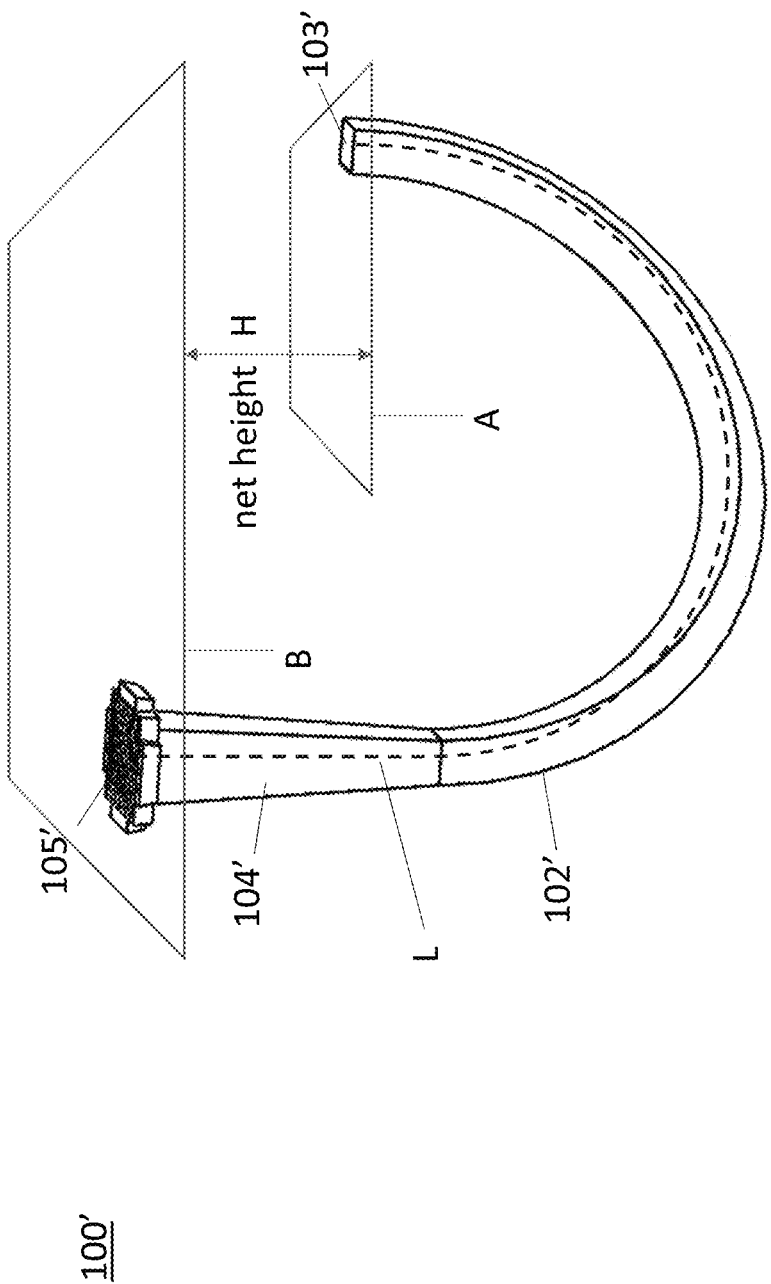

By way of further illustration, FIG. 1F shows how a net height of a light pipe according to various embodiments may be defined. Specifically, FIG. 1F depicts a light pipe 100', which similar to the above light pipe 100 includes a curved light-guiding waveguide segment 102' that extends to a flared light-guiding waveguide segment 104', where the waveguide segment 102' provides an input surface 103' of the light pipe through which light from a light source (not shown) enters the light pipe and the flared light-guiding waveguide segment 104' provides an output surface 105' through which light can exit the light pipe. A putative surface A is placed tangent to and in contact with the input surface 103' and another putative surface B is placed tangent to and in contact with the output surface 105'. The shortest distance between the two putative surfaces as depicted by the line segment (H), which in this case is perpendicular to both putative surfaces, corresponds to the net height of the light pipe. Further, the nominal length of this light pipe is defined by the length of an arc segment (L) that provides the shortest distance between the input and the output surfaces of the light pipe along a path within the light pipe. In this case, the arc segment (L) extends between the input and the output surfaces along a central portion of the light pipe.

By way of example, and without limitation, the net height of a light pipe according to various embodiments of the present teachings, such as the above light pipe 100, can be in a range of about +20 mm to about −20 mm. Further, in some embodiments, the nominal length of a light pipe according to various embodiments can be in a range of about 50 mm to about 100 mm, though any other suitable length can also be employed, e.g., based on an intended application for the light pipe.

As discussed in more detail further below, it has been unexpectedly discovered that the use of a generally rhombus transverse cross-sectional profile for various light-guiding segments of a light pipe according to various embodiments results in a significant improvement in the quality of the output beam. By way of example, the output beam can exhibit a divergence less than about 60 degrees while exhibiting a suitable color uniformity when light sources emitting light of different colors are used to illuminate the input surface of the light pipe. Further, the use of a generally rhombus transverse cross-sectional profile can provide, e.g., in combination with a lens coupled to the output surface of the light pipe, an increased output light intensity and an improved beam divergence (a narrower output beam), e.g., due to the use of a flared/tapered portion. Further, in various embodiments, a light pipe according to the present teachings exhibits improved color-mixing, e.g., due to the increased length of the light pipe and the generally rhombus transverse cross-section.

In particular, the curved light-guiding waveguide segment of the light pipe helps impart an increased length to the light pipe. Further, without being limited to any particular theory, in various embodiments, the generally rhombus transverse cross-sectional shape of the light pipe may enable an enhanced color mixing by ensuring a more balanced reflection of the light propagating along the curved light-guiding waveguide segment from the inner and outer surfaces of the curved light-guiding waveguide segment.

In sum, in various embodiments, a light pipe according to the present teachings can improve the peak intensity of the output light, the beam divergence angle, as well as intensity and color uniformity of the output light beam.

While in the above embodiment the light pipe exhibits a flared profile, in other embodiments, the light pipe may have a uniform transverse cross-sectional area from its input surface to its output surface, i.e., it can exhibit an untapered profile.

In some embodiments, a single lens can be coupled to the output surface of the light pipe to shape the light exiting the light pipe. By way of example, FIG. 2A shows a partial view of such a light pipe 200 having a convex lens 202 that is coupled to an output surface 204 of the light pipe to receive the light exiting the output surface and reduce the divergence angle of the output light beam. By way of example, the lens 202 can provide a positive optical power in a range of about 10 D to about 500 D, e.g., in a range of about 100 D to about 400 D, or any other sub-range.

Figure 2B:
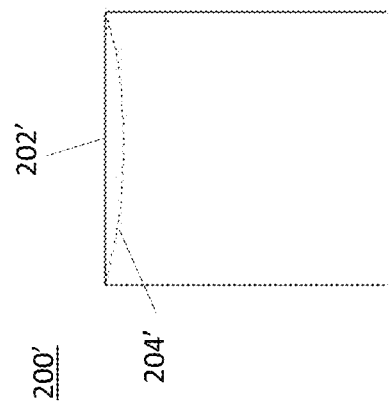
FIG. 2B is a partial schematic view of a light pipe according to an embodiment in which a divergent lens is coupled to its output surface.
Figure 2A:
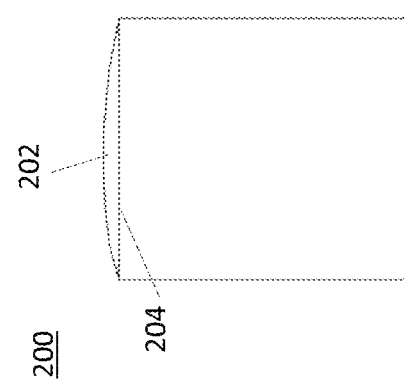
FIG. 2A is a partial schematic view of a light pipe according to an embodiment in which a convergent lens is coupled to its output surface.

By way of example, FIG. 2B shows a partial view of a light pipe 200' according to another embodiment in which a concave lens 202' is coupled to an output surface 204' of the light pipe. The concave lens 202' can provide a negative optical power for causing an increase in the divergence angle of the output beam. By way of example, the concave lens 202' can provide an optical power in a range of about −10 D to about −500 D.

In some embodiments, the lens coupled to the output surface can be a separate element than the light pipe and can be coupled to the light pipe using any suitable mechanism, e.g., such as those discussed above. In some embodiments, the lens and the rest of the light pipe are integrally formed. For example, the output surface of the light pipe itself can have a curved profile, e.g., a convex or a concave profile, to function as a lens for shaping the light exiting the light pipe. By way of example, the curvature of the output surface of the light pipe can be selected so as to provide a positive or a negative optical power in a range of about 10 D to about 500 D.

It has been discovered that in various embodiments the use of a single lens coupled to the output surface of the light pipe provides an output beam with better beam quality than using a plurality of microlenses coupled to the output surface of the light pipe.

Figure 3:
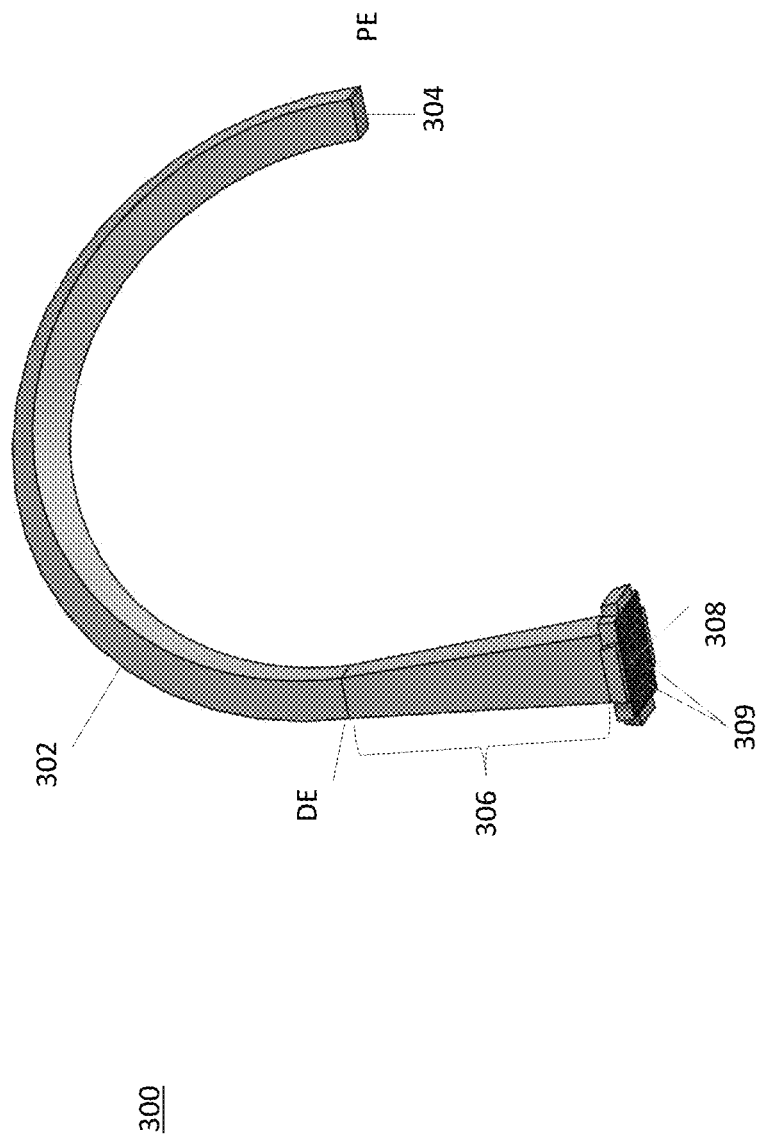
FIG. 3 is a perspective schematic view of a light pipe according to an embodiment, which includes a curved light-guiding waveguide segment providing a light input surface and terminating at a flared light-guiding waveguide segment providing a light output surface.

FIG. 3 schematically depicts a light pipe 300 that includes a curved light-guiding waveguide segment 302 that extends from a proximal end (PE), which provides an input surface 304 that can be coupled to a light source (not shown in this figure) to receive at least a portion of the light emitted by the light source, to a distal end (DE). As in the previous embodiments, the curved light-guiding waveguide segment 302 can be characterized by a single curvature, a plurality of discrete curvatures or a continuously-changing curvature. Similar to the previous embodiments, in this embodiment, the curved light-guiding segment has a rhombus transverse cross-sectional profile. Further, in this embodiment, the cross-sectional area of the curved light-guiding segment is substantially uniform from the proximal end to the distal end of the light-guiding segment, i.e., the curved light-guiding segment is untapered.

The curved light-guiding waveguide segment 302 extends from the input surface 304 to a flared light-guiding segment 306 that extends from the distal end of the curved light-guiding segment 302 to an output surface 308 of the light pipe through which light can exit the light pipe. In this embodiment, the tapered light-guiding waveguide segment exhibits an increasing cross-sectional area extending from the distal end of the curved light-guiding segment to the output surface of the light pipe.

By way of example, and without limitation, the draft angle of the tapered light-guiding segment 306 can be equal to or less than about 20°, e.g., in a range of about 1° degree to about 20°.

In this embodiment, a plurality of microlenses 309 is distributed over the output surface 308 of the light pipe. By way of example, the microlenses can be in the form of a plurality of hemispherical lenses with a size characterized by a diameter in a horizontal cross section in a range of about 0.05 mm to about 1 mm and a radius (i.e., the size of the arc of the hemisphere in a vertical cross section) in a range of about 0.5 mm to about 5 mm. In other embodiments, the output surface of the light pipe may be flat, or it may have a single lens coupled thereto as described herein.

In this embodiment, the input and the output surfaces of the light pipe, namely, the input surface 304 and the output surface 308 are offset relative to one another such that the light pipe exhibits a non-zero net height. By way of example, the net height of the light pipe can be in a range of about 1 mm to about 20 mm, though other offsets may also be utilized, e.g., based on the intended application of the light pipe.

Though not shown in this embodiment, rather than utilizing a plurality of microlenses, a single lens can be coupled to the output surface 308 of the light pipe to shape the light exiting the light pipe, e.g., in a manner discussed above in connection with the previous embodiments.

In various embodiments, one advantage of the flared light-guiding waveguide segment is that it helps narrow the divergence of the light rays received from the curved light-guiding segment. By way of example, the passage of the rays through the curved light-guiding segment may result in an increase in the divergence of the light rays, which would result, without the flared light-guiding segment, in an output beam that would exhibit a divergence angle (e.g., a divergence angle associated with full width at half maximum of the intensity of the light beam in a plane perpendicular to the general direction of the beam's propagation), greater than about 100 degrees FWHM. In some embodiments, the flared light-guiding segment can allow achieving an output beam having a beam divergence angle in a range of about 30 degrees FWHM to about 80 degrees FWHM.

In some embodiments, the curved light-guiding segment 302 and the flared light-guiding segment 306 form an integral unit. In some other embodiments, the curved light-guiding segment 302 and the flared light-guiding segment 306 can be formed as separate parts and coupled to one another, e.g., via an adhesive, or any other suitable mechanism.

Figure 4A:
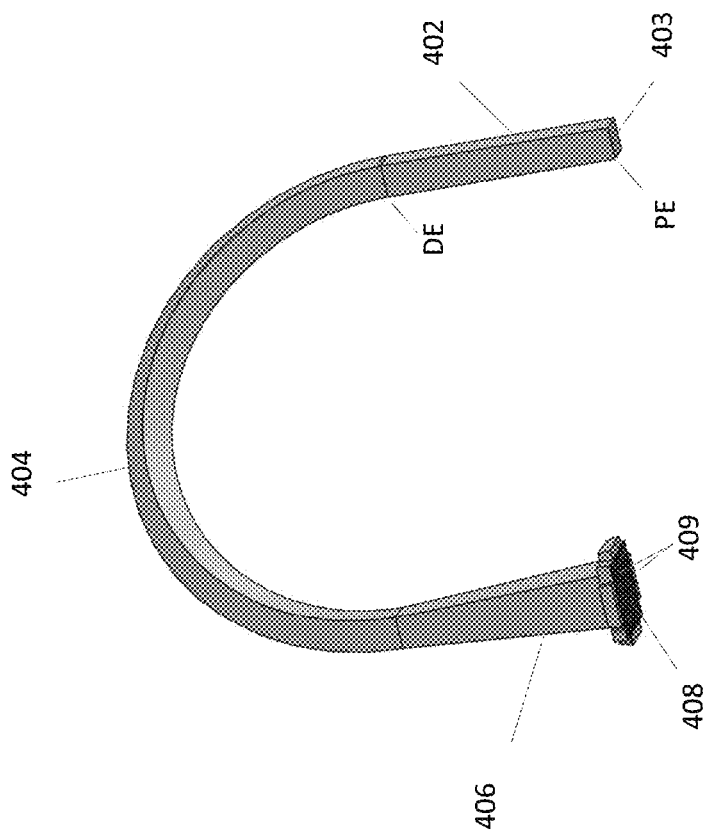
FIG. 4A is a perspective schematic view of a light pipe according to an embodiment, which includes a straight input light-guiding waveguide segment, a flared output light-guiding waveguide segment and a curved light-guiding waveguide segment positioned between the straight light input segment and the flared light output segment.

FIG. 4A schematically depicts a light pipe 400 according to another embodiment, which includes three light-guiding segments 402, 404 and 406. In this embodiment, the transverse cross-sectional profile of each of the light-guiding segments is a rhombus. The light-guiding segment 402 is a straight section that extends from a proximal end providing a light input surface 403 (herein also referred to as a light-receiving surface) to a distal end at which it is joined to a proximal end of the curved light-guiding segment 404, which is positioned between the straight light-guiding segment 402 and a flared light-guiding segment 406.

The flared light-guiding waveguide segment 406 is similar to the flared light-guiding waveguide segment 306 described above. More specifically, the flared light-guiding segment 406 exhibits a progressively increasing cross-sectional area from its proximal end, which is joined to a distal end of the curved light-guiding segment, to a distal end that provides an output surface 408 through which light can exit the light pipe. In this embodiment, a plurality of microlenses 409 are distributed over the output surface 408, though in other embodiments, the output surface may be flat or it may a flat surface coupled to a lens.

In this embodiment, the light-guiding waveguide segments 402, 404, and 406 are sized and arranged such that the light pipe exhibits a zero net height. In other words, in this embodiment, the light input surface 403 and the light output surface 408 of the light pipe are positioned at substantially the same level, i.e., there is no vertical offset between the input and the output surfaces.

The light input surface of the light pipe can be optically coupled to a light source (not shown in this figure) to receive at least a portion of the light emitted by the light source. A portion of the light received by the straight light-guiding segment 402 can advance along that light-guiding segment via one or multiple total internal reflections at the lateral surfaces thereof. In some cases, at least a portion of the light received by the straight light-guiding waveguide segment 402 can pass through that light-guiding segment to reach the curved light-guiding segment 404 without undergoing TIR at the lateral surfaces.

The light rays received by the curved light-guiding segment 404 can undergo one or more TIR at the lateral surfaces of the curved light-guiding segment and advance from the proximal end thereof to its distal end to be received by the flared light-guiding segment. At least some of the light rays received by the flared light-guiding segment may reach the output surface 408 of the light pipe without undergoing TIR at the lateral surfaces of the flared light-guiding segment while another portion of the light rays may undergo one or more TIR at the lateral surfaces of the flared light-guiding segment to reach the light pipe's output surface.

Similar to the previous embodiments, a single lens can be coupled to the output surface 408 of the light pipe to shape the light beam exiting the light pipe. Again, similar to the previous embodiments, the lens can be formed as an integral unit with the remainder of the light pipe, e.g., at a curved output surface.

Figure 4B:
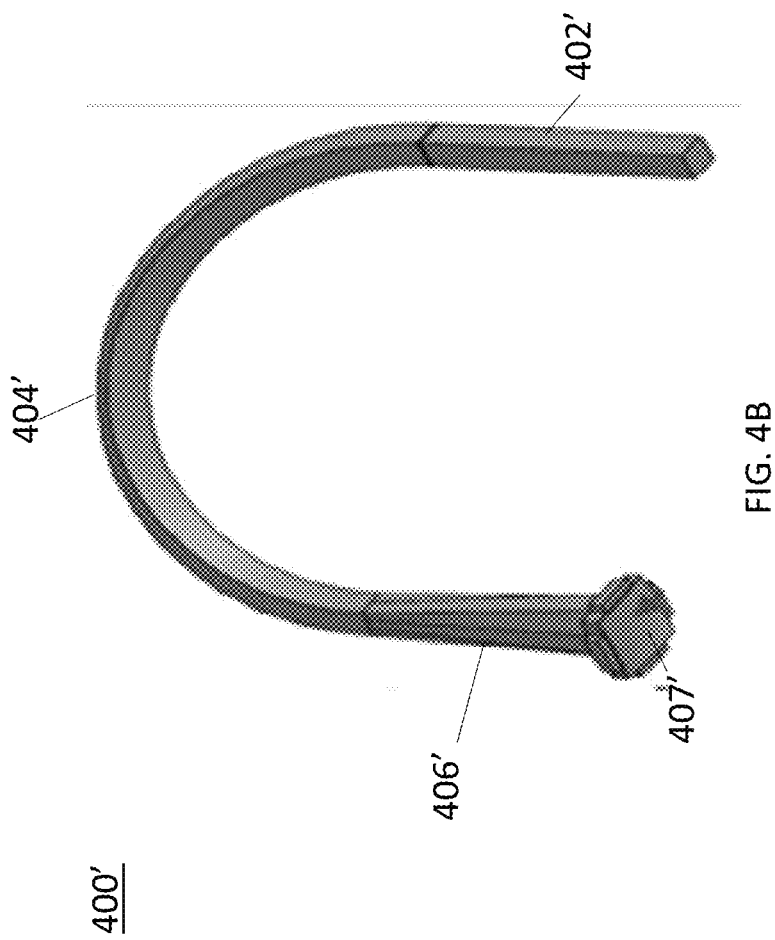
FIG. 4B is a perspective schematic view of a light pipe according to an embodiment, which includes a straight input light-guiding waveguide segment, a curved light-guiding waveguide segment and a flared output light-guiding waveguide segment, where the input and the curved light-guiding waveguide segments have a rhombus transverse cross-sectional profile and the output waveguide segment includes a proximal portion having a rhombus transverse cross-sectional profile that transitions to an octagonal transverse cross-sectional profile in a distal portion thereof, FIG. 4C schematically depicts a pattern of microlenses that were employed in several simulated light pipes for which an illumination pattern associated with an output beam was computed.

FIG. 4B schematically depicts a light pipe 400' according to another embodiment, which similar to the light pipe 400 described above, includes an input light-guiding waveguide segment 402', a curved light-guiding waveguide segment 404', and a flared output light-guiding waveguide segment 406'. Each of the input and the curved light-guiding waveguide segments includes a transverse rhombus cross-sectional profile. The output light-guiding waveguide segment 406' includes a proximal portion exhibiting a rhombus transverse cross-sectional profile that transitions to a distal portion that exhibits an octagonal transverse cross-sectional profile.

The octagonal portion of the output light-guiding segment can advantageously allow using the light pipe to project an illumination pattern on a target surface with an illumination geometry that is closer to a circular geometry. A single lens 407' is coupled to the output surface of the light pipe to shape the beam exiting the light pipe.

The following examples are provided to further elucidate various aspects of the present teachings, and are not provided to indicate, necessarily, the optimal ways of practicing the present teachings and/or optimal results that may be obtained.

EXAMPLES

Figure 4C:
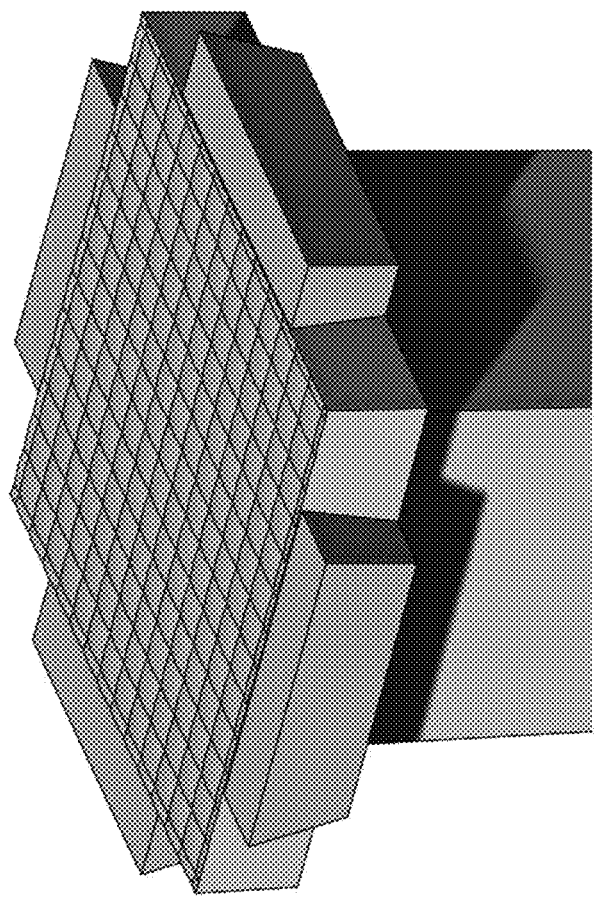

A simulation software marketed by Synopsys under trade designation LightTools was employed to compute an output beam generated by a plurality of simulated light pipes. The input light introduced into each of the simulated light pipes was obtained from a "rayfile" data for Osram Ostar Stage 4-color RGBW LED provided by Osram. Except for the simulated light pipe described below in connection with Example 9, the other simulated light pipes included an array of 13×13 of microlenses on their output surfaces with fractional microlenses around the outer perimeter of the array, as shown schematically in FIG. 4C. The radius of curvature of the microlenses was selected to be 2.2 mm.

Example 1

Figures 5A, 5B, 5C:
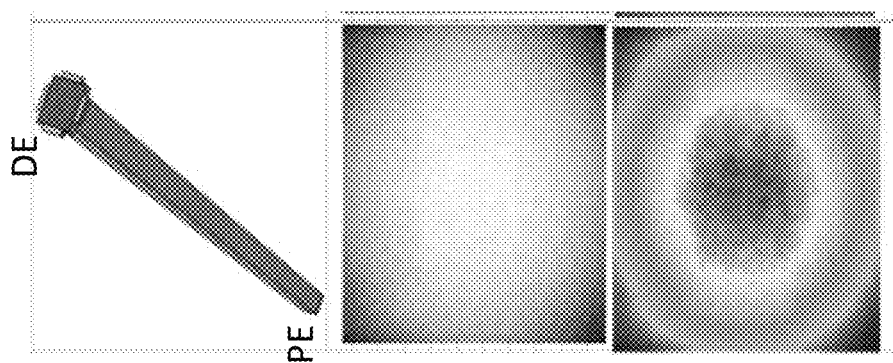
FIG. 5A shows a schematic view of a simulated light pipe having a straight, tapered profile.
FIGS. 5B and 5C show the computed intensity profile of the output beam generated by the light pipe depicted in FIG. 5A in two illustration formats.

The simulation software was employed to define a tapered light pipe that extended from a proximal end (PE) providing a light input surface for receiving light to a distal end (DE) providing an output surface through which light exits the light pipe. The transverse cross-sectional profile of the light pipe was defined to be a square cross section with the input surface having a surface area of 9 mm$^2$. Further, the light pipe was defined to have a length of 65 mm and a flared profile with a draft angle of 1 degree that resulted in a surface area of 25 mm$^2$ for its output surface. FIG. 5A shows a schematic view of the simulated light pipe.

FIGS. 5B and 5C show the computed intensity profile of the output beam in a plane perpendicular to the general direction of the beam's propagation in two illustration formats. The divergence angle of the output beam associated with full width at half maximum (FWHM) intensity was 59° in the azimuthal direction and 61° in the altitudinal direction. The divergence angle of the output beam corresponding to full width at 10% of the maximum intensity was computed to be 73° in the azimuthal direction and 74° in the altitudinal direction. The luminous flux of the output beam was computed to be 1169 lumens. The efficiency of the light pipe for the transfer of the light energy from light pipe's input to its output was computed to be 57% and the luminous intensity of the output light was computed to be 1517 candela.

This simulated light pipe was employed as a reference light pipe with which the performance of the other simulated light pipes discussed below was compared.

Example 2

Figures 6A, 6B, 6C:
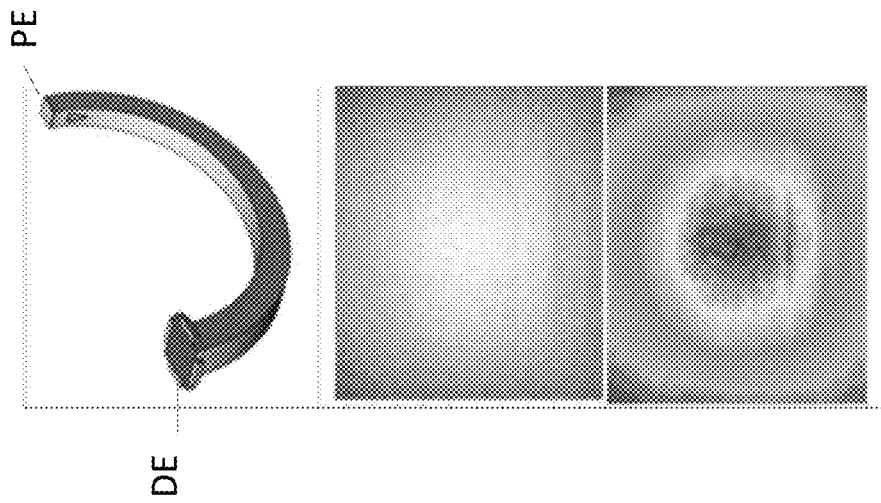
FIG. 6A shows a simulated light pipe having a tapered U-shaped profile and extending from a proximal end (PE) providing an input surface to a distal end (DE) providing an output surface.
FIGS. 6B and 6C show computed intensity profile of an output beam generated by the simulated light pipe depicted in FIG. 6A in a plane transverse to the beam's general propagation direction and in two illustration formats.

FIG. 6A shows a simulated light pipe having a tapered U-shaped profile and extending from a proximal end (PE) providing an input surface having a surface area of 9 mm$^2$ to a distal end (DE) providing an output surface having a surface area of 25 mm$^2$.

FIGS. 6B and 6C show computed intensity profile of the output beam in a plane perpendicular to the general propagation direction of the beam in two illustration formats. The divergence angle of the output beam corresponding to FWHM was computed to be 51° in the azimuthal direction and 67° in the altitudinal direction. Further, the divergence angle of the output beam corresponding to full width at 10% of the maximum intensity was computed to be 68° in the azimuthal direction and 108° in the altitudinal direction. In other words, the output beam generated by this light pipe exhibited a lower divergence relative to the output beam generated by the reference light pipe. The efficiency of the light pipe for transfer of light energy from the input to the output was calculated to be 55%. The luminous flux was computed as 1120 lumens and the luminous intensity was calculated to be 1225 candela.

The output beam's intensity profile shows a stripe in the lower portion of the beam, which results in a lower beam quality than that generated by light pipes having a rhombus transverse cross-sectional profile.

Example 3

Figures 7A, 7B, 7C:
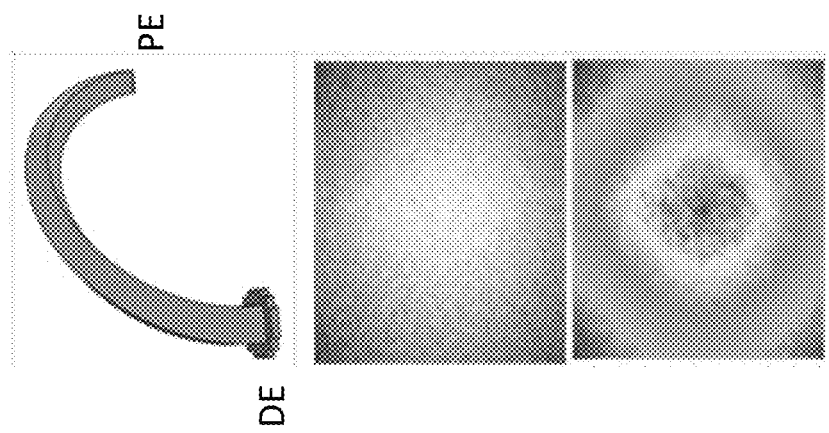
FIG. 7A shows a simulated light pipe having a tapered U-shaped profile with a rhombus transverse cross section, which extends from a proximal end providing an input surface to a distal end providing an output surface.
FIGS. 7B and 7C show computed intensity profile of the output beam in a plane perpendicular to the general direction of the beam's propagation in two illustration formats.

FIG. 7A shows a simulated light pipe having a tapered U-shaped profile and extending from a proximal end (PE) providing an input surface having a surface area of 9 mm$^2$ to a distal end (DE) providing an output surface having a surface area of 25 mm$^2$. The transverse cross-sectional profile of the light pipe was selected as a rhombus.

FIGS. 7B and 7C show computed intensity profile of the output beam in a plane perpendicular to the general propagation direction of the output beam in two illustration formats. The divergence angle of the output beam corresponding to FWHM was computed to be 61° in the azimuthal direction and 56° in the altitudinal direction. Further, the divergence angle of the output beam corresponding to full width at 10% of the maximum intensity was computed to be 99° in the azimuthal direction and 100° in the altitudinal direction. In other words, the output beam generated by this light pipe exhibited a lower divergence relative to the output beam generated by the reference light pipe. The efficiency of the light pipe for transfer of light energy from the input to the output was calculated to be 55%. The luminous flux was computed as 1124 lumens and the luminous intensity was calculated to be 1204 candela.

The output beam shows a slightly oval intensity profile.

Example 4

Figures 8A, 8B, 8C:
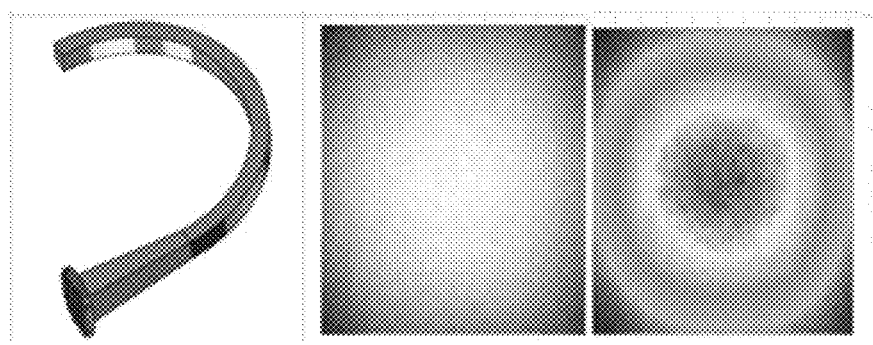
FIG. 8A shows a simulated light pipe having a curved U-shaped light-guiding waveguide segment providing an input surface and a flared light-guiding waveguide segment that extends from an end of the curved light-guiding waveguide segment to an output surface, where both light-guiding waveguide segments exhibited a square transverse cross section.
FIGS. 8B and 8C show computed intensity profile of a simulated output beam in a plane transverse to the beam's general propagation direction generated by the simulated light pipe depicted in FIG. 8A and presented in two illustration formats.

FIG. 8A shows a simulated light pipe having a curved U-shaped light-guiding segment providing an input surface having a surface area of 9 mm$^2$ and a flared light-guiding segment that extends from an end of the curved light-guiding segment to an output surface having a surface area of 25 mm$^2$. The transverse cross-sectional profile of this light pipe was selected to be a square cross section.

FIGS. 8B and 8C show computed intensity profile of the output beam in a plane transverse to the beam's propagation direction in two illustration formats. The divergence angle of the output beam corresponding to FWHM was computed to be 61° in the azimuthal direction and 56° in the altitudinal direction. Further, the divergence angle of the output beam corresponding to full width at 10% of the maximum intensity was computed to be 99° in the azimuthal direction and 100° in the altitudinal direction. In other words, the output beam generated by this light pipe exhibited a lower divergence relative to the output beam generated by the reference light pipe. The efficiency of the light pipe for transfer of light energy from the input to the output was calculated to be 55%. The luminous flux was computed as 1124 lumens and the luminous intensity was calculated to be 1204 candela.

The output beam shows a slightly oval intensity profile.

Example 5

Figure 9A:
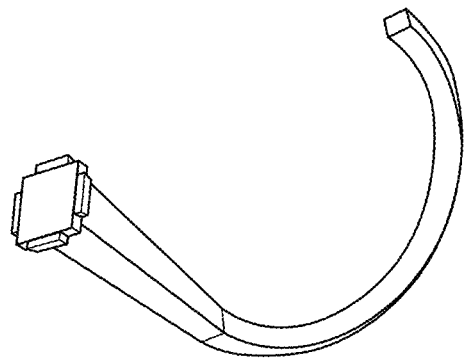
FIG. 9A shows a simulated light pipe having an untapered curved U-shaped light-guiding waveguide segment with a rhombus transverse cross-sectional profile providing an input surface that extends to a tapered flared light-guiding waveguide segment having a rhombus transverse cross-sectional profile.

FIG. 9A shows a simulated light pipe having an untapered curved U-shaped light-guiding segment with a rhombus transverse cross-sectional profile providing an input surface having a surface area of 9 mm$^2$ that extends to a flared light-guiding segment having a rhombus transverse cross-sectional profile that is tapered at a draft angle of 3 degrees and provides an output surface having a surface area of 25 mm$^2$. The input and the output surfaces were offset relative to one another such that the light pipe exhibited an effective (or net) height of 20 mm.

Figure 9B:
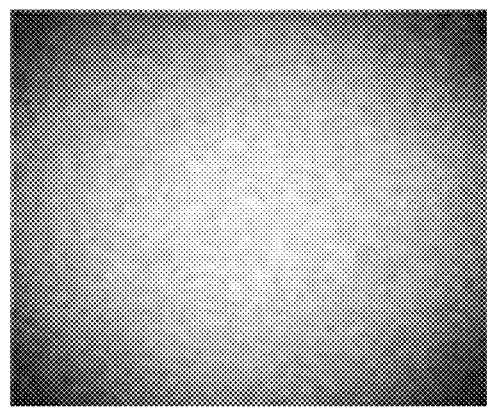
FIGS. 9B and 9C show computed intensity profile of a simulated output beam generated by the light pipe depicted in FIG. 9A in a plane perpendicular to the output beam's general propagation direction in two illustration formats.
Figure 9C:
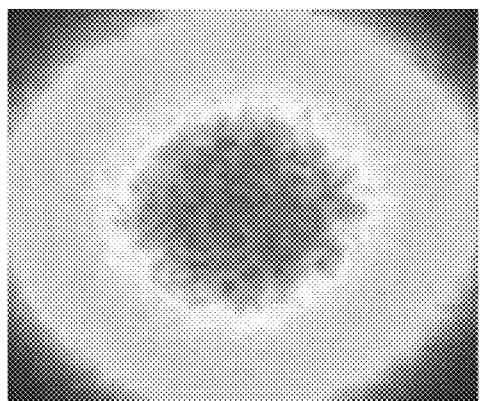

FIGS. 9B and 9C show computed intensity profile of the output beam in a plane perpendicular to the output beam's propagation direction in two illustration formats. The divergence angle of the output beam corresponding to FWHM was computed to be 61.4° in the azimuthal direction and 61.8° in the altitudinal direction. Further, the divergence angle of the output beam corresponding to full width at 10% of the maximum intensity was computed to be 77.1° in the azimuthal direction and 77.0° in the altitudinal direction. The efficiency of the light pipe for transfer of light energy from its input to its output was calculated to be 55%. The luminous flux was computed as 1118 lumens and the luminous intensity was calculated to be 1401 candela.

The output beam shows a slightly oval intensity profile.

Example 6

Figure 10A:
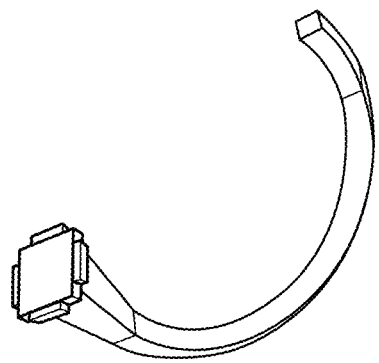
FIG. 10A shows a simulated light pipe having an untapered curved U-shaped light-guiding waveguide segment with a rhombus transverse cross-sectional profile positioned between a 10-mm long untapered input light-guiding waveguide segment with a rhombus transverse cross-sectional profile and a 10-mm long flared output segment with a rhombus transverse cross-section profile.

FIG. 10A shows a simulated light pipe having an untapered curved U-shaped light-guiding segment with a rhombus transverse cross-sectional profile positioned between a 10-mm long untapered input light-guiding waveguide segment with a rhombus transverse cross-sectional profile and a 10-mm long flared output light-guiding waveguide segment with a rhombus transverse cross-section profile that shows a taper at a draft angle of 6 degrees. The light pipe exhibited a zero effective height (i.e., the input and the output surfaces were at the same height).

Figure 10B:
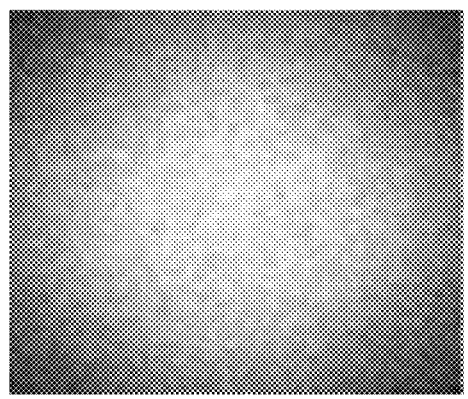
FIGS. 10B and 10C show computed intensity profile of a simulated output beam using the light pipe of FIG. 10A in a plane transverse to the beam's general propagation direction in two illustration formats.
Figure 10C:
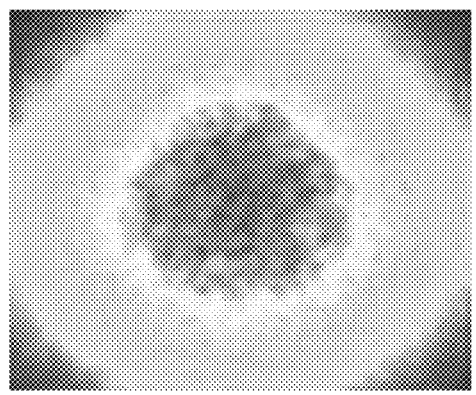

FIGS. 10B and 10C show computed intensity profile of the output beam in a plane perpendicular to the beam's general propagation direction in two illustration formats. The divergence angle of the output beam corresponding to FWHM was computed to be 62.6° in the azimuthal direction and 62.8° in the altitudinal direction. Further, the divergence angle of the output beam corresponding to full width at 10% of the maximum intensity was computed to be 81.8° in both the azimuthal and altitudinal directions. The efficiency of the light pipe for transfer of light energy from its input to its output was calculated to be 55%. The luminous flux was computed as 1117 lumens and the luminous intensity was calculated to be 1423 candela.

Example 7

Figure 11A:
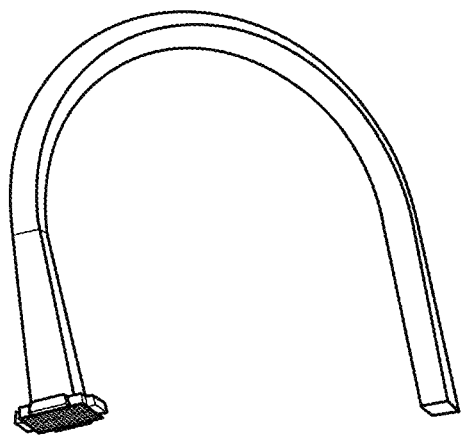
FIG. 11A shows a simulated light pipe having an untapered curved U-shaped light-guiding waveguide segment with a rhombus transverse cross-sectional profile positioned between a 20-mm long untapered input light-guiding waveguide segment with a rhombus transverse cross-sectional profile and a 20-mm long flared output light-guiding waveguide segment with a rhombus transverse cross-sectional profile.

FIG. 11A shows a simulated light pipe having an untapered curved U-shaped light-guiding segment with a rhombus transverse cross-sectional profile positioned between a 20-mm long untapered input light-guiding waveguide segment with a rhombus transverse cross-sectional profile and a 20-mm long flared output light-guiding waveguide segment with a rhombus transverse cross-sectional profile that shows a taper at a draft angle of 3 degrees. The light pipe exhibited a zero effective height (i.e., the input and the output surfaces were at the same height).

Figure 11B:
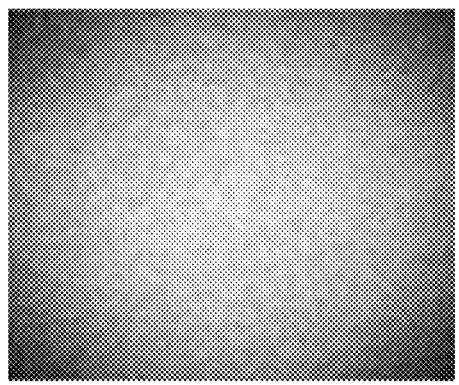
FIGS. 11B and 11C show computed intensity profile of a simulated output beam generated using the light pipe depicted in FIG. 11A in two illustration formats.
Figure 11C:
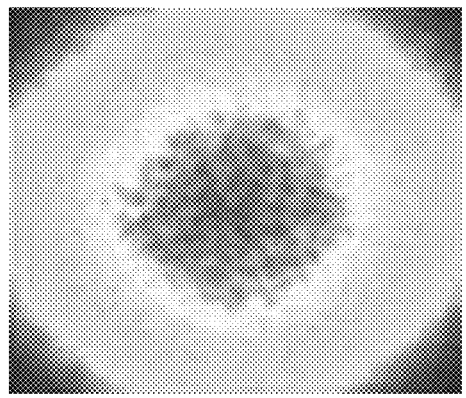

FIGS. 11B and 11C show computed intensity profile of the output beam in a plane perpendicular to the beam's general propagation direction in two illustration formats. The divergence angle of the output beam corresponding to FWHM was computed to be 61° in both the azimuthal and altitudinal directions. Further, the divergence angle of the output beam corresponding to full width at 10% of the maximum intensity was computed to be 81.8° in both the azimuthal and altitudinal directions. The efficiency of the light pipe for transfer of light energy from its input to its output was calculated to be 55%. The luminous flux was computed as 1112 lumens and the luminous intensity was calculated to be 1413 candela.

Example 8

Figure 12:
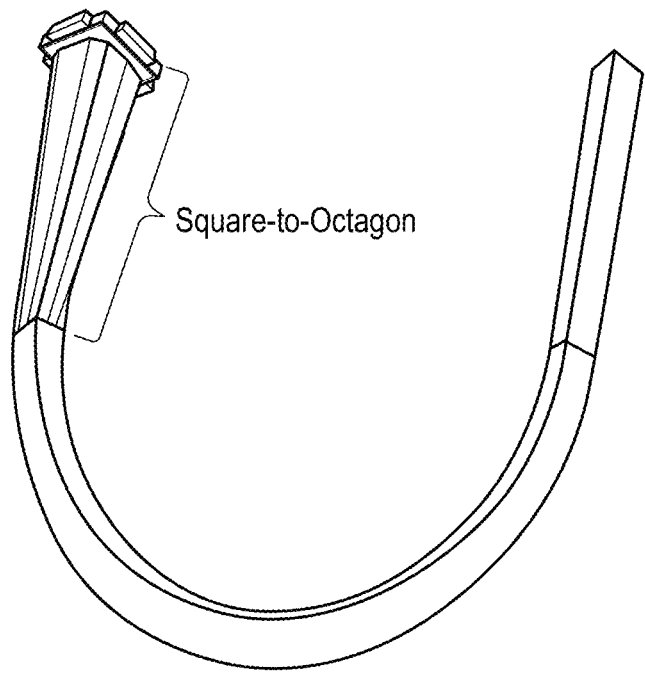
FIG. 12 shows a simulated light pipe having an input light-guiding waveguide segment, a curved light-guiding waveguide segment and a flared output light-guiding waveguide segment, where the input and the curved light-guiding waveguide segments are untapered and have a rhombus transverse cross-sectional profile and the flared output light-guiding waveguide segment transitions from a rhombus transverse cross-sectional profile to an octagonal transverse cross-sectional profile.

FIG. 12 shows another simulated light pipe having a 20-mm input light-guiding waveguide segment, a 20-mm output light-guiding waveguide segment and a curved light-guiding waveguide segment positioned between the input and the output light-guiding waveguide segments. The input and the output light-guiding waveguide segments are untapered with a rhombus transverse cross-sectional profile and the output light-guiding waveguide segment exhibited a flared longitudinal profile with a transverse cross-sectional profile that transitions from a rhombus to an octagonal profile.

The divergence angle of the output beam corresponding to FWHM was computed to be 51° in both the azimuthal and longitudinal directions and the respective divergence angle of the output beam corresponding to full width at 10% of the maximum intensity was computed to be 71° in both the azimuthal and longitudinal directions. The efficiency of the light pipe for transfer of energy from its input to its output was computed to be 55%. Further, the luminous flux associated with the output beam was computed as 1113 lumens and the luminous intensity was computed as 1699 candela. Thus, this light pipe exhibited an excellent beam angle, and luminous intensity and flux as a well as a zero net height.

Example 9

Figure 13:
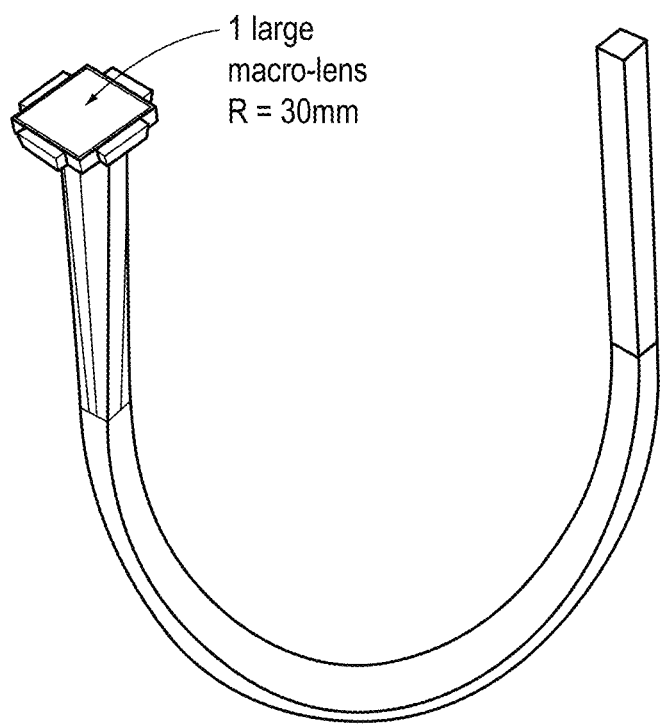
FIG. 13 shows another simulated light pipe that has the same structure as the light pipe depicted in FIG. 12, but with a single macro-lens with a 30-mm radius of curvature coupled to its output surface.

FIG. 13 shows another simulated light pipe that has the same structure as the light pipe depicted in FIG. 12, but with a single macro-lens with a 30-mm radius of curvature coupled to the output surface of the light pipe.

The divergence angle of the output beam corresponding to FWHM was computed to be 52° in both the azimuthal and longitudinal directions and the respective divergence angle of the output beam corresponding to full width at 10% of the maximum intensity was computed to be 68° in both the azimuthal and longitudinal directions. The efficiency of the light pipe for transfer of energy from its input to its output was computed to be 54%. Further, the luminous flux associated with the output beam was computed as 1112 lumens and the luminous intensity was computed as 1775 candela. This light pipe provided an excellent output beam with somewhat better simulated properties compared to a similar light pipe with a microlens array positioned at its output surface.

The above data shows that the examples of the simulated light pipe having a rhombus transverse cross-sectional profile provide a beam quality that is substantially similar to the beam quality achieved by the reference light pipe without the artefacts, such as stripes, seen in the output beam generated by some of the simulated light pipes having a square transverse cross-sectional profile.

Various embodiments address a deterioration in the uniformity of the light emerging from some light pipes by modifying the light pipe in the manner described below. In particular, some embodiments reduce or eliminate the deterioration by modifying the design of the waveguide.

Figure 14A:
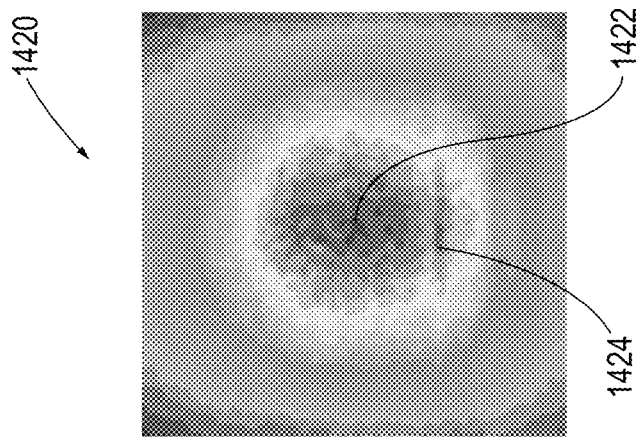
FIG. 14A illustrates one example of the deterioration in the uniformity of the light output for a non-modified waveguide 1410.
Figure 14A:
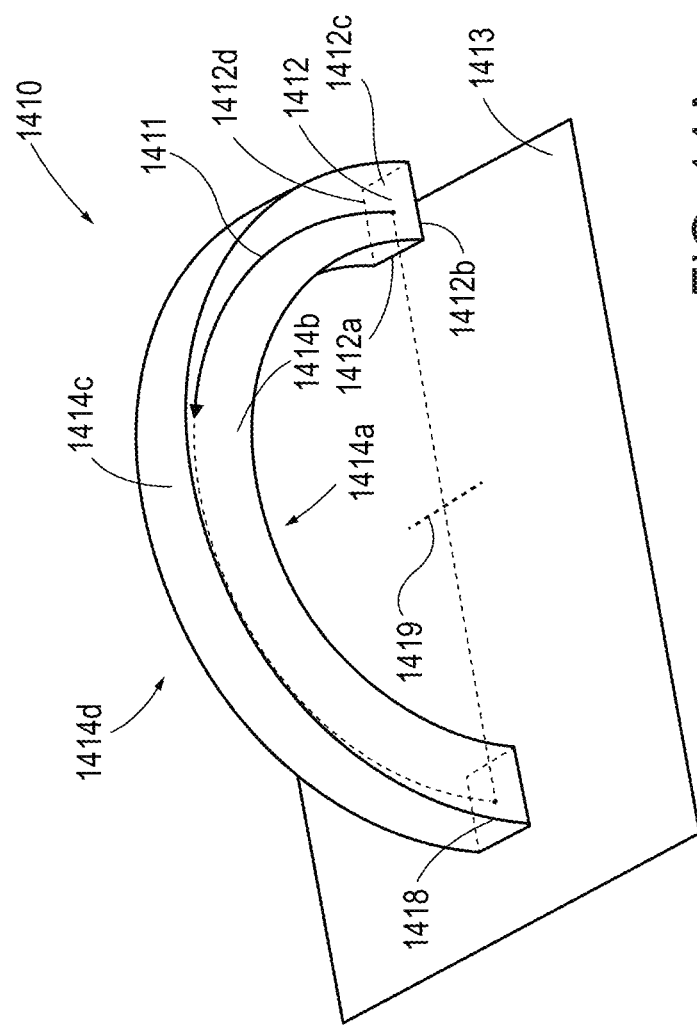

By way of example, FIG. 14A shows a non-modified waveguide 1410 and a heat map 1420 that visualizes the intensity of the non-uniform light that may emerge from non-modified waveguide 1410. Waveguide 1410 includes a square shaped input surface 1412 (having four sides labeled 1412a-1412d), a square shaped output surface 1418, and four lateral surfaces 1414a-1414d that extend between input surface 1412 and output surface 1418. Input surface 1412 defines a base plane 1413 on which input surface 1412 is located. In non-modified waveguide 1410, the envelope of the waveguide may be generated by rotating input surface 1412 around a rotational axis 1419 that is located on base plane 1413, as indicated by a curved arrow 1411.

Heat map 1420, derived via simulations (sometimes called false-color simulations), visualizes the light intensity pattern of the light output generated by non-modified waveguide 1410. More specifically, heat map 1420 may correspond to the intensity pattern for the light that may exit output surface 1418 when a light source illuminates non-modified waveguide 1410 through input surface 1412. The light source may be positioned at or near the center of input surface 1412. Further, the intensity of the light that may exit output surface 1418 may be measured on a surface that is positioned near output surface 1418 and is parallel to output surface 1418. As seen in heat map 1420, the emerging light shows non uniform intensity. More specifically, on the one hand, heat map 1420 mostly displays circularly shaped bands of constant intensity all centered around a center 1422, indicating an intensity that uniformly changes as a function of the distance from center 1422. But heat map 1420 also displays an interference stripe 1424 that indicates a horizontal region of constant intensity, thus breaking the circular symmetry of the intensity.

Interference stripe 1424 may result from interference between light rays that are reflected by lateral surfaces 1414a-1414d. In some cases, such an interference may be generated by a pair of lateral surfaces that are collectively parallel to the rotational axis, as defined below. One example of such a pair of lateral surfaces is the pair of lateral surfaces 1414a and 1414c in non-modified waveguide 1410. In some embodiments, such pair of lateral surfaces may be termed a pair of interfering lateral surfaces for reference.

In various embodiments, a surface is considered to be parallel to the rotational axis if for any plane that contains the rotational axis and intersects the surface, the intersection of the plane and the surface generates a line section that is parallel to the rotational axis. Moreover, two or more surfaces are considered to be collectively parallel to the rotational axis if there exists one or more planes that contain the rotational axis and intersect all of the two or more surfaces; and, for all such planes, the intersection of the plane and each of the two or more surfaces generates a line section that is parallel to the rotational axis. Therefore, for each such plane, the intersections of the plane and the two or more surfaces are parallel to each other. The definition of being collectively parallel to the rotational axis may be generalized to a single surface by defining that a surface is collectively parallel to the rotational axis if the surface is parallel to the rotational axis in the manner defined above. The property of being collectively parallel may be utilized reflexively, that is, if one or more surfaces are collectively parallel to a rotational axis, conversely the rotational axis may be termed to be collectively parallel to the one or more surfaces.

In some embodiments, if two lateral surfaces of a waveguide are collectively parallel to the rotational axis, those two lateral surfaces may cause interference between light rays that are reflected by them and therefore those two lateral surfaces may be considered interfering lateral surfaces. In some embodiments, in order to cause the interference, the pair of interfering lateral surfaces should span the whole length of the waveguide from the input surface to the output surface, as is the case for non-modified waveguide 1410, for example. More generally, in an optical system such as a light pipe that includes a waveguide, the waveguide may cause the interference if it includes a pair of lateral surfaces that are collectively parallel to the rotational axis and span the whole length of the section of the light pipe that is not straight.

Figure 14B:
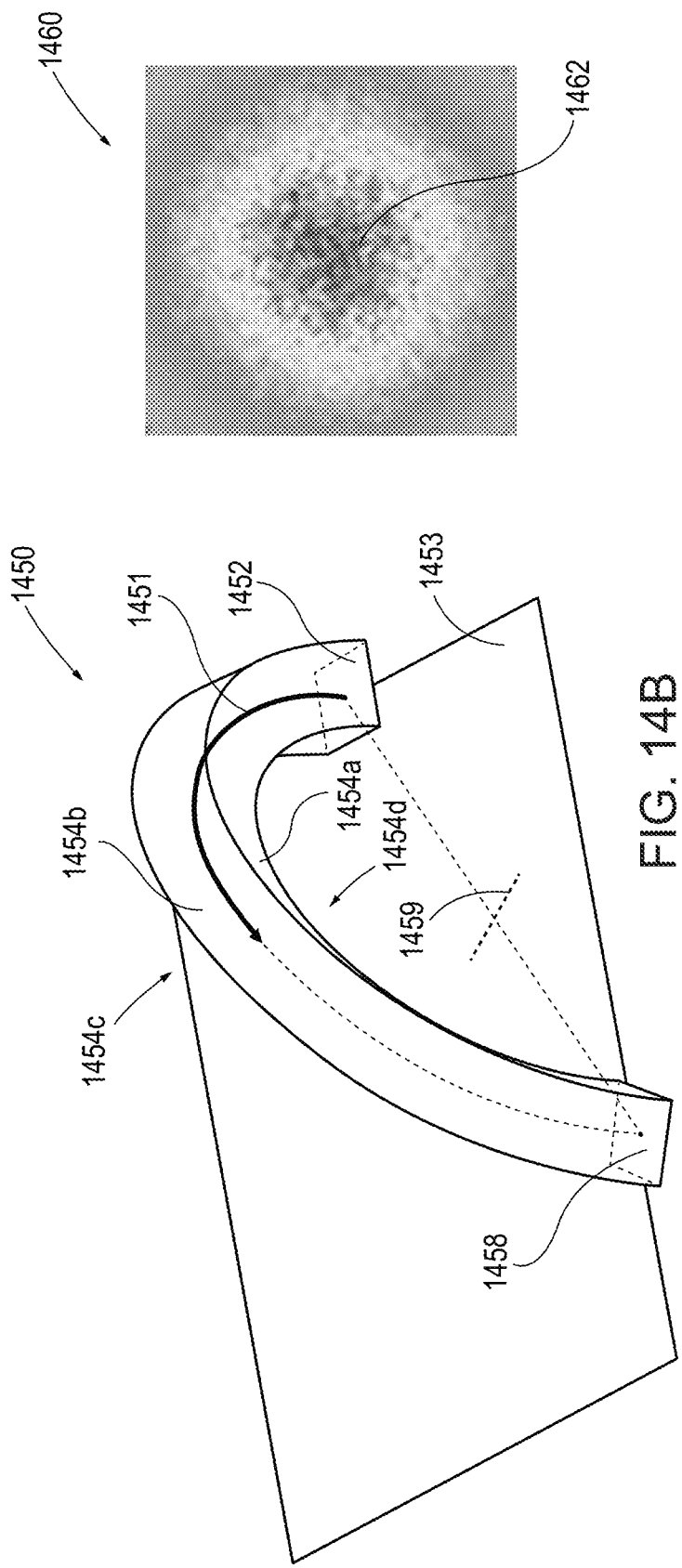
FIG. 14B shows a modified waveguide 1450 according to some embodiments.
Figure 14C:
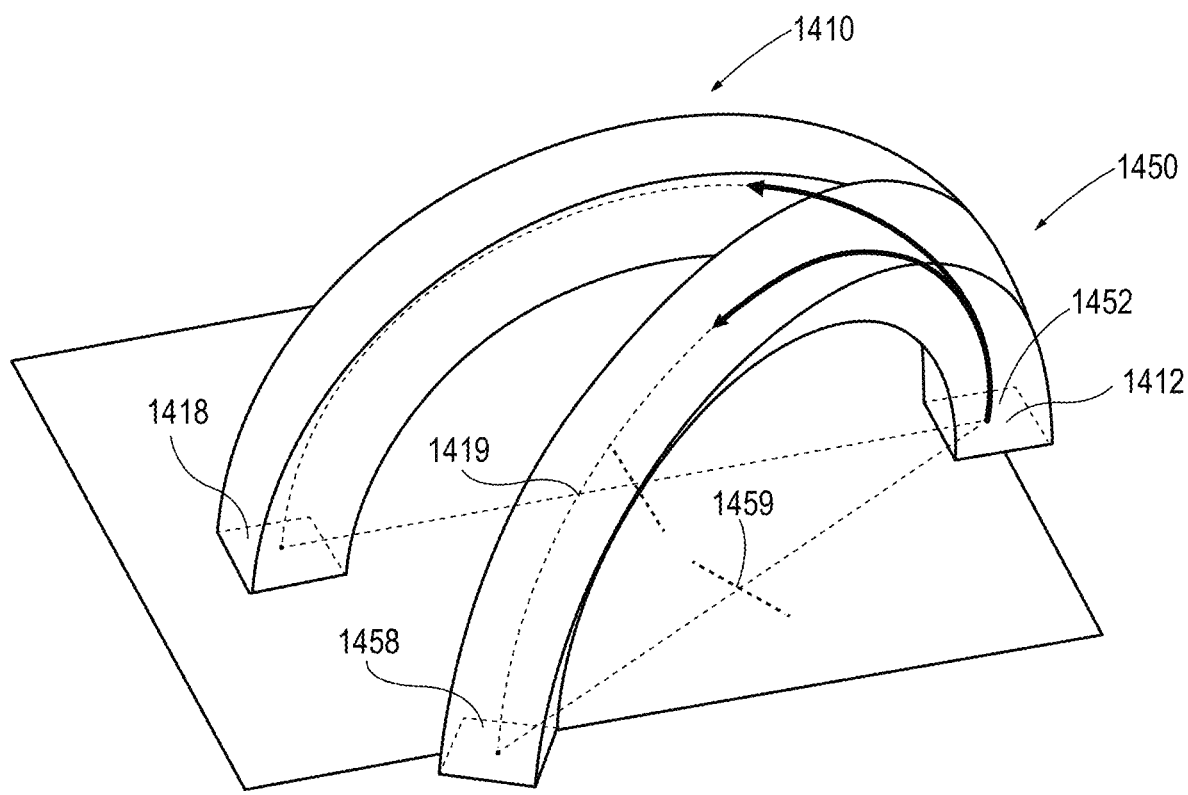
FIG. 14C shows waveguide 1450 alongside waveguide 1410 for comparison.

Some embodiments address the above-described non uniformity of the light output of the non-modified waveguide by modifying the design of the waveguide such that the lateral surfaces do not include interfering lateral surfaces in the manner shown above for the non-modified waveguides. For example, FIG. 14B shows a waveguide 1450 for which the design of waveguide 1410 has been modified according to some embodiments. FIG. 14B also includes a heat map 1460, derived via simulations (sometimes called false-color simulations), that visualizes the intensity of the light that may emerge from waveguide 1450. Further, FIG. 14C shows waveguide 1450 alongside waveguide 1410 for comparison.

Waveguide 1450 includes an input surface 1452 (located on a base plane 1453), an output surface 1458, and four lateral surfaces 1454a-1454d that extend between input surface 1452 and output surface 1458. Both input surface 1452 (having four sides labeled 1452a-1452d) and output surface 1458 are square shaped. Other embodiments may use other shapes for the input surface or the output surface as will be described later. Further, the envelope of waveguide 1450 may be generated by rotating input surface 1452 around a rotational axis 1459 as indicated by a curved arrow 1451. At the end of the rotation, input surface 1452 may overlap with output surface 1458. In some embodiments, such as in waveguide 1450, the rotational axis may be located on the base plane defined by the input surface. For example, for waveguide 1450, rotational axis 1459 is located on base plane 1413.

In various embodiments, input surface 1452 may be swept by a rotational angle with various magnitudes to generate the envelope of waveguide 1450. For example, in the embodiment shown in FIG. 14B the rotational angle may be 180°, so that output surface 1458 is also located on base plane 1453. In other embodiments, the rotational angle may be below or above 180°. For example, in some embodiments, the rotational angle may be less than 180° so that output surface 1458 is located above base plane 1453.

In various embodiments, waveguide 1450 with its modified design may receive, at input surface 1452, input light generated by one or more light sources and cause mixing of the received light to an output light at output surface 1458 that is more uniform compared to the output light generated by non-modified waveguide 1410 receiving the same input light. This improvement over the non-modified waveguides can be observed in heat map 1460. More specifically, heat map 1460 shows a uniform distribution of the light intensity that has a circular symmetry around a center located approximately at center 1462. In particular, heat map 1460 does not show the above-described non-uniformity features observed in heat map 1420. Therefore, as compared to non-modified waveguide 1410, modified waveguide 1450 achieves a better level of light mixing or color mixing.

Waveguide 1450 may thus reduce the interferences between the light rays that may undergo multiple reflections at the lateral surfaces of the wave guide prior to exiting through output surface 1458. Waveguide 1450 may achieve this improvement because, due to its modified design, waveguide 1450 does not include interfering lateral surfaces in the manner present in non-modified waveguide 1410.

In some embodiments, the difference between the designs of the non-modified waveguides and the modified waveguides may be described by the difference in the relationship of the rotational axis and the input surface. More specifically, in some embodiments, the difference exists because, while in the non-modified waveguide the rotational axis may be parallel to two or more sides of the input surface, the rotational axis of the modified waveguide may be parallel to none or at most one of the sides of the input surface.

This difference in the relationship of the rotational axis and the input surface is illustrated in FIGS. 14A and 14B. For waveguide 1410, rotational axis 1419 is parallel to two of the sides of input surface 1412, which are labeled 1412a and 1412c. As a result, in non-modified waveguide 1410, the rotational axis is collectively parallel to lateral surfaces 1414a and 1414c, which are generated as the envelope of the two sides 1412a and 1412c, which thus form a pair of interfering lateral surfaces.

For waveguide 1450, on the other hand, rotational axis 1459 is not parallel to any of the sides of input surface 1452. More specifically, compared to input surface 1412, input surface 1452 has been rotated by 45° around its center. In some embodiments, such an input surface that does not include a pair of sides that are parallel to the rotational axis may be termed a tilted input surface with respect to the rotational axis.

Figure 14D:
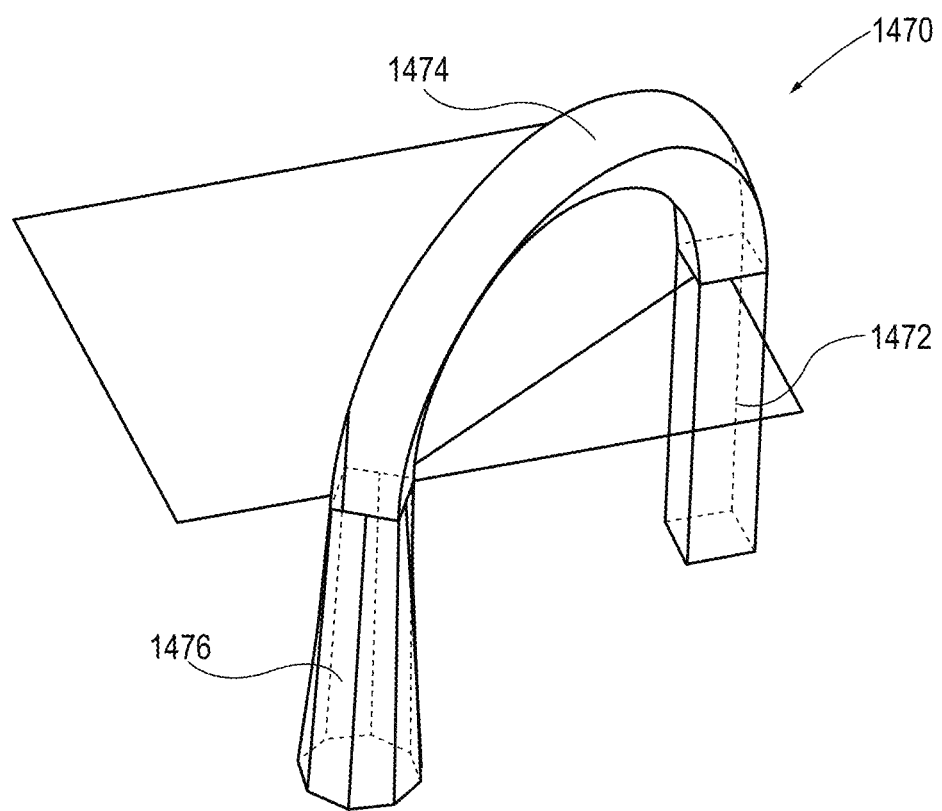
FIG. 14D illustrates a light pipe 1470 that includes additional segments according to some such embodiments.

Waveguide 1450 may be combined with other parts to generate an optical system such as a light pipe. In some such embodiments, a light pipe that incorporates a modified waveguide may further include additional segments that are attached to, and able to optically communicate with, the modified waveguide through its input surface or its output surface. FIG. 14D illustrates a light pipe 1470 according to some such embodiments. Light pipe 1470 includes an input segment 1472, a waveguide 1474, and an output segment 1476. Waveguide 1474 is a modified waveguide with a modified design that is similar to the design of waveguide 1450. More specifically, waveguide 1474 includes a square shaped input surface and a square shaped output surface. Moreover, in waveguide 1474, the input surface is a tilted input surface with respect to the rotational axis. Therefore, waveguide 1474 does not include interfering lateral surfaces.

In various embodiments, the light pipe may include one or both of the input segment and the output segment. Moreover one or both of the input segment and the output segment may have a constant cross-sectional profile or a varying cross-sectional profile. For example, in light pipe 1470, input segment 1472 has a constant square shape cross section that matches and fits to the input surface of waveguide 1474. Output segment 1476, on the other hand, has a square shape cross section on one end that matches the output surface of waveguide 1474. The cross section of output segment 1476, however, continuously changes from the square shape to a hexagon on the other end.

Different embodiments may use different shapes for the input surface or for the output surface. For example, while for waveguide 1450 input surface 1452 is a square shaped rhombus, in some embodiments the input surface may be shaped as a non-square rhombus. Non-square rhombus shapes may include a rhombus in which at least one of the angles is different from 90°. For example, in a non-square rhombus, two opposite angles may be equal acute angles while the other two opposite angles are equal astute angles, as described earlier.

Figure 15A:
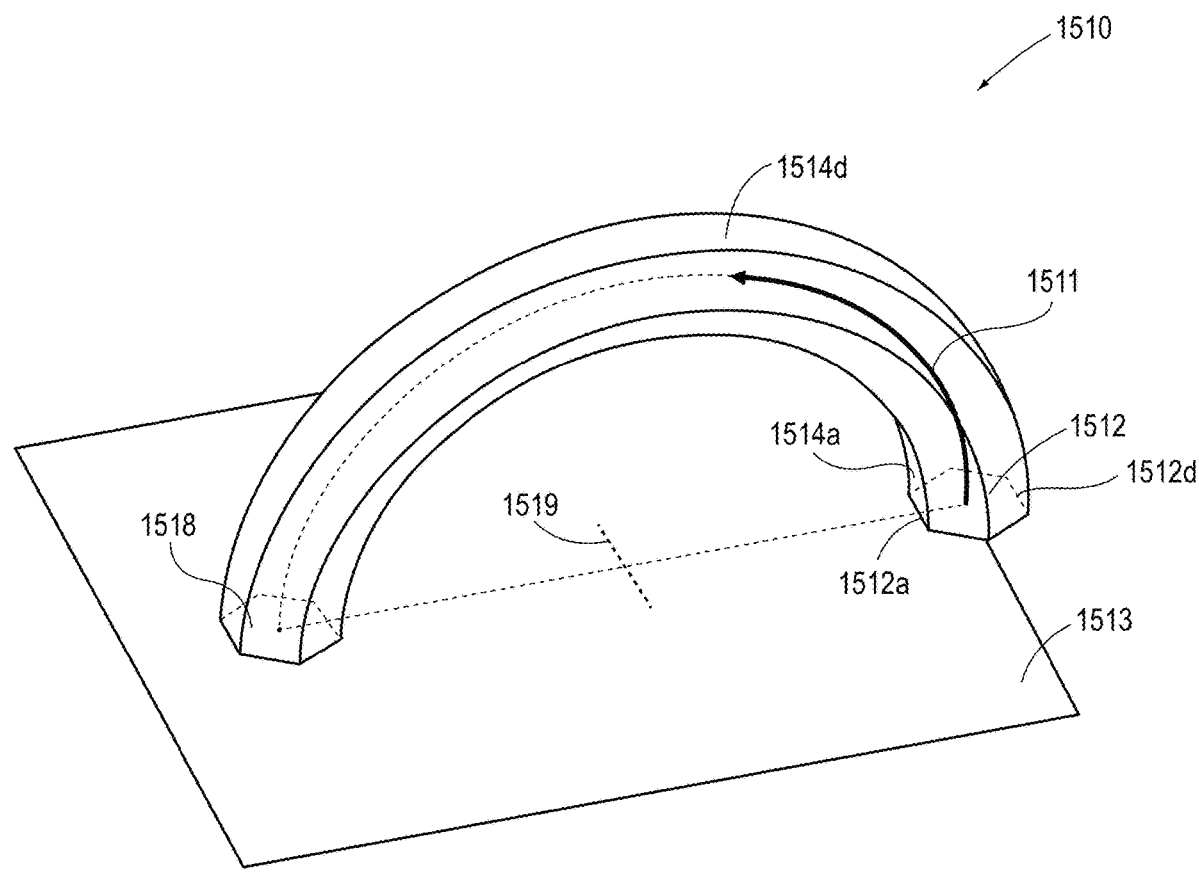
FIG. 15A illustrates a non-modified waveguide 1510.
Figure 15B:
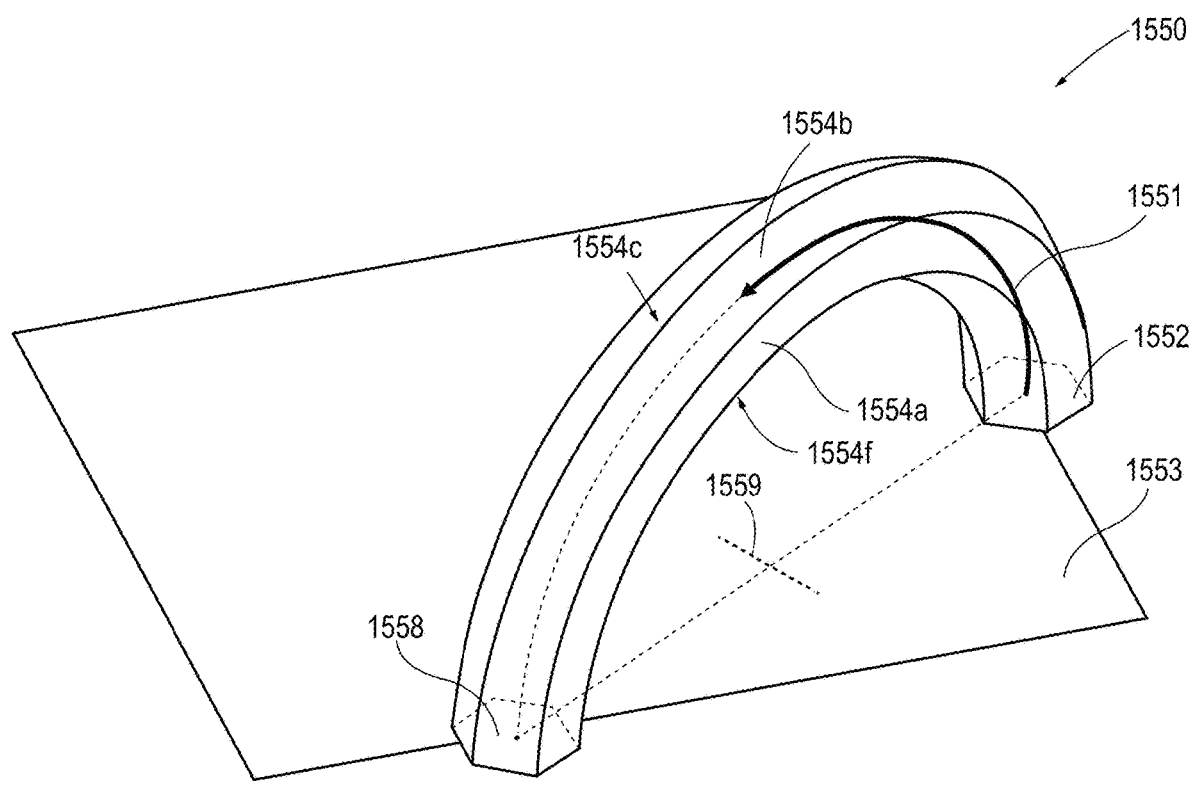
FIGS. 15B and 15C illustrate a waveguide 1550 with a modified design according to some embodiments.
Figure 15C:
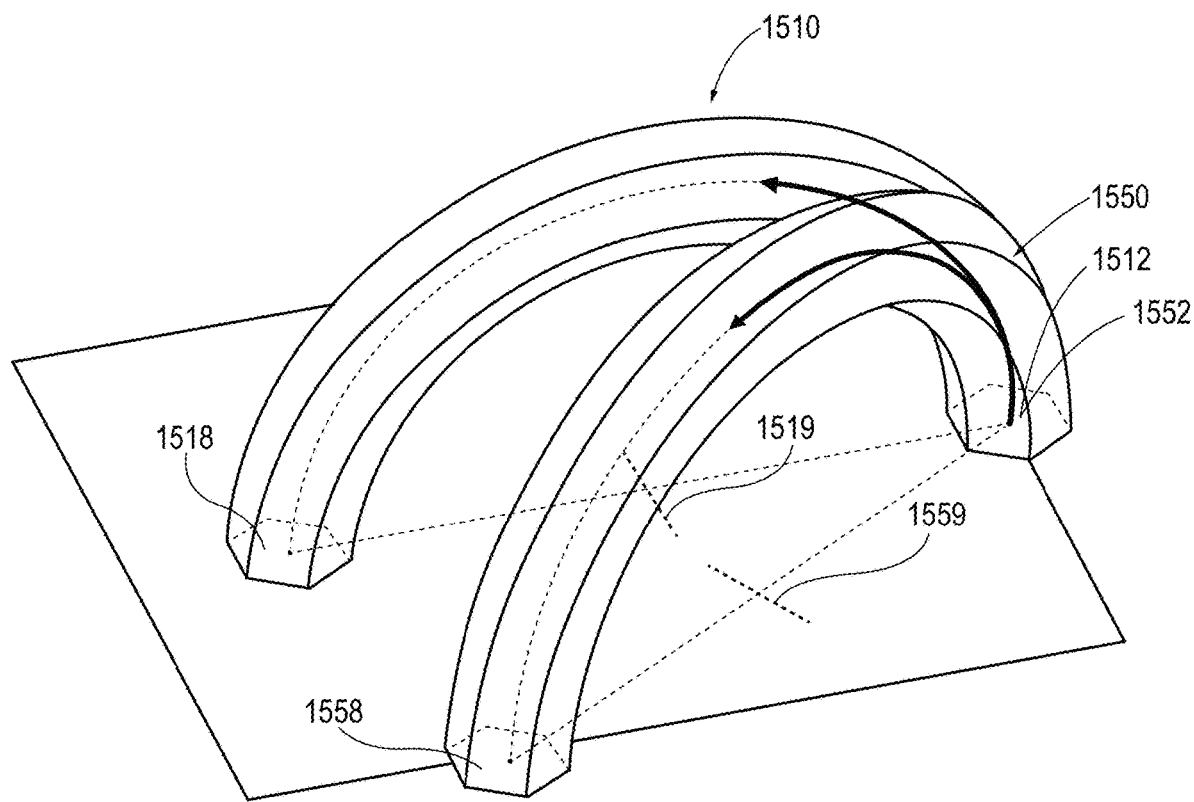

In yet some other embodiments, the input surface or the output surface may be shaped as a polygon with more than four sides. FIG. 15A illustrates a non-modified waveguide 1510, while FIGS. 15B and 15C illustrate a waveguide 1550 with a modified design according to some embodiments. For both non-modified waveguide 1510 and waveguide 1550 the input surface and the output surface are shaped as equilateral hexagons. Further FIGS. 15A-15C illustrate that non-modified waveguide 1510 includes a pair of interfering lateral surfaces while waveguide 1550 does not include such pairs of lateral surfaces.

More specifically, non-modified waveguide 1510 includes an input surface 1512, which defines a base plane 1513, six lateral surfaces 1514a-1514f, and an output surface 1518. Input surface 1512 is shaped as an equilateral hexagon with six equal sides 1512a-1512f. Similar to the case of non-modified waveguide 1410, the envelope of non-modified waveguide 1510 may be generated by rotating input surface 1512 around a rotational axis 1519 that is located on base plane 1513. This rotation is indicated by the curved arrow 1511. Moreover, also similar to the case of non-modified waveguide 1410, the output light generated by non-modified waveguide 1510 may be non-uniform due to the existence of interfering lateral surfaces. In particular, non-modified waveguide 1510 includes a pair of interfering lateral surfaces 1514a and 1514d that may cause interferences that deteriorate the uniformity of the output light generated by the waveguide in a manner similar to the interference described for non-modified waveguide 1410. The pair of interfering lateral surfaces 1514a and 1514d result from the rotation of the pair of sides 1512a and 1512d, which are parallel to rotational axis 1519. Therefore, rotational axis 1519 is collectively parallel to lateral surfaces 1514a and 1514d.

On the other hand, as seen in FIGS. 15B and 15C, the design of waveguide 1550 has been modified as compared to non-modified waveguide 1510 to address the above-described problems of non-modified waveguide 1510. Waveguide 1550 includes an input surface 1552 that has a hexagonal shape, six lateral surfaces 1554a-1554f, and an output surface 1558. Further, the envelope of waveguide 1550 may be generated by rotating input surface 1552 around a rotational axis 1559. This rotation is indicated by the curved arrow 1551. In some embodiments, such as in waveguide 1550, rotational axis 1559 may be located on a base plane 1553 defined by input surface 1552. Waveguide 1550 exhibits a modified design such that, unlike non-modified waveguide 1510, waveguide 1550 does not include a pair of interfering lateral surfaces. This characteristic may result from the fact that input surface 1552, unlike input surface 1512 in non-modified waveguide 1510, does not include a pair of sides that are parallel or perpendicular to rotational axis 1559. Therefore, for waveguide 1550, rotational axis 1559 is not collectively parallel to any pair of the lateral surfaces in waveguide 1550.

Figure 16A:
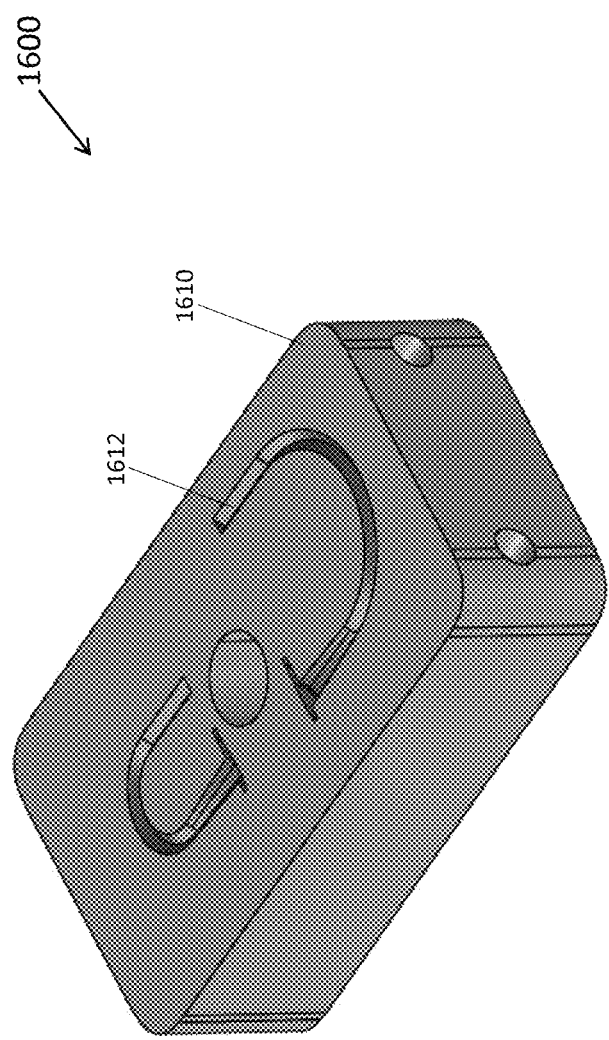
FIGS. 16A-16D illustrate the advantages in molding a waveguide for which the design has been modified according to some embodiments.
Figure 16B:
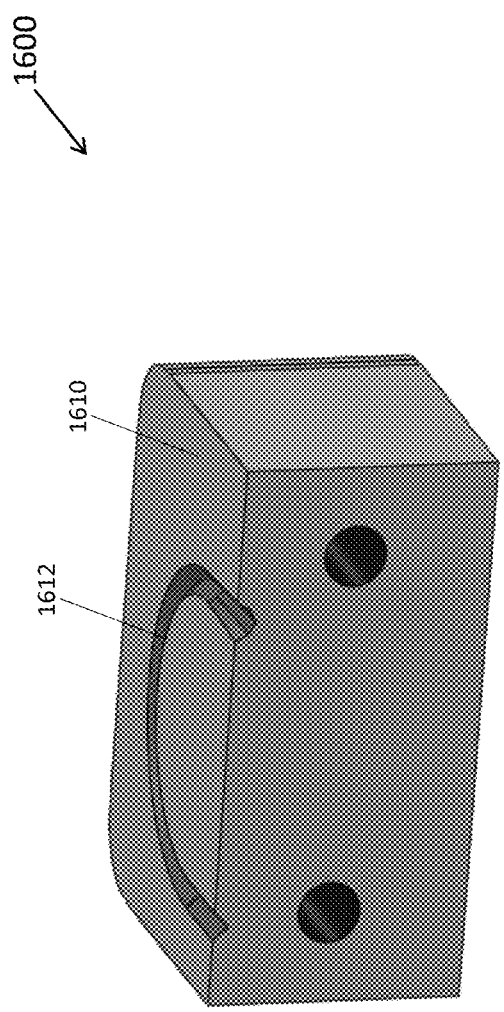
Figure 16C:
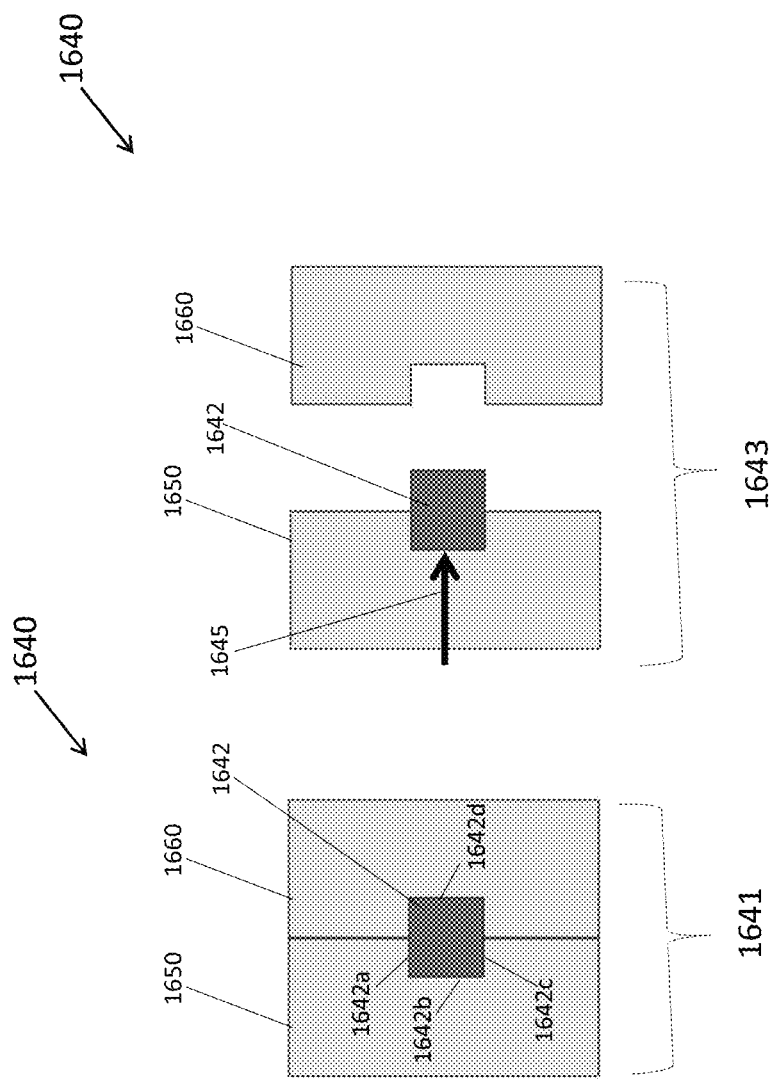
Figure 16D:
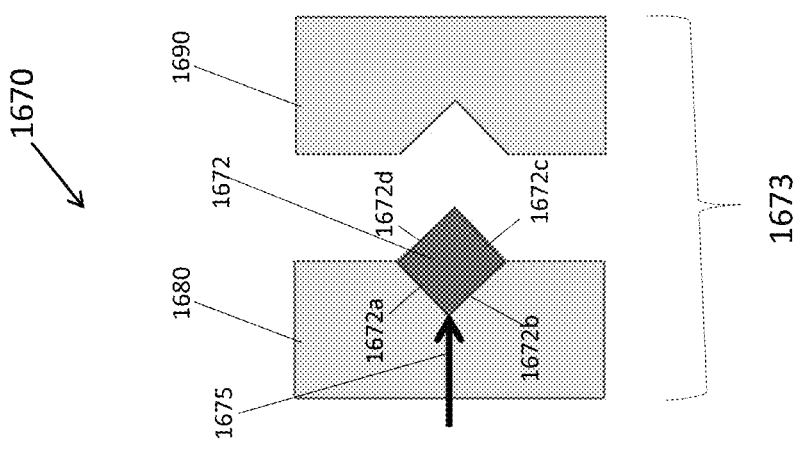
Figure 16D:
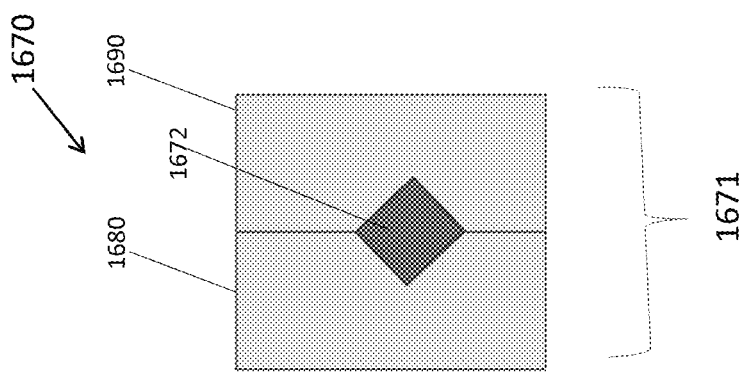

Besides the above-described improvements in the output, some embodiments further facilitate manufacturing of the waveguide through molding. FIGS. 16A-16D illustrate the advantages in molding a modified waveguide according to some embodiments. More specifically, FIGS. 16A and 16B show views of a pair of half-molds that may be used to manufacture a modified waveguide, such as waveguide 1450 or waveguide 1550 discussed above. FIGS. 16C and 16D, on the other hand, illustrate some advantages of the modified design by showing schematic side views of two pairs of half-molds that may be used for manufacturing, respectively, a non-modified waveguide and a modified waveguide, according to some embodiments.

More specifically, FIGS. 16A and 16B illustrate a mold 1600 that may be utilized for molding a waveguide with a modified design according to some embodiments. Mold 1600 includes a first half-mold 1610 and a second half-mold (not shown), which may be a mirror image of first half-mold 1610. First half-mold 1610 includes a first groove 1612 and the second half-mold includes a second groove. The first half-mold and the second half-mold are designed such that, when attached, the first groove and the second groove join to form a channel for receiving a molten material corresponding to the modified wave guide. Once cooled, the molten material solidifies into the body of a modified waveguide. As the next step in manufacturing the modified waveguide, the first half-mold and the second half-mold are detached and moved apart, and the solidified waveguide is removed. The modified waveguides may provide advantages in this process over non-modified waveguides.

The schematics in FIGS. 16C and 16D illustrate some of the advantages by comparing some steps of the manufacturing of a non-modified waveguide and the manufacturing of a modified waveguide according to some embodiments.

More specifically, FIG. 16C shows a simplified cross-sectional view of a mold 1640 for manufacturing a non-modified waveguide. Mold 1640 includes a first half-mold 1650 and a second half-mold 1660. When attached, first half-mold 1650 and second half-mold 1660 form an internal channel with a square cross section, inside which a non-modified waveguide 1642 is solidified, as shown in section 1641 of FIG. 16C. Waveguide 1642 includes four lateral surfaces 1642a-1642d. After waveguide 1642 is solidified, its four lateral surfaces are attached to the walls of the internal channel formed by first half-mold 1650 and second half-mold 1660.

Next, to extract waveguide 1642, first half-mold 1650 and second half-mold 1660 are detached and moved apart, as shown in section 1643 of FIG. 16C. As a result, waveguide 1642 is detached from second half-mold 1660. More specifically, lateral surface 1642d and the right hand side half of each of lateral surfaces 1642a and 1642c are detached from the corresponding walls of the half channel in second half-mold 1660, while lateral surface 1642b and the left hand side half of each lateral surface 1642a and 1642c remain attached to the corresponding walls of the half channel in first half-mold 1650.

Next, a force 1645 may be applied to waveguide 1642 for detaching waveguide 1642 from first half-mold 1650. As a result of force 1645, waveguide 1642 may move to the right. During this motion to the right, first lateral surface 1642b detaches from the corresponding wall of the half channel in first half-mold 1650, but the left hand side halves of lateral surfaces 1642a and 1642c remain partially in contact with the corresponding walls of the half channel in first half-mold 1650 until waveguide 1642 is fully removed from that half channel. Therefore, due to the friction resulting from this contact, force 1645 may remain in place throughout the detachment of waveguide 1642 from first half-mold 1650. As a result, force 1645, as well as the friction between sections of lateral surfaces 1642a and 1642c and the respective surfaces of first half-mold 1650, may leave marks on waveguide 1642 or cause defects in its shape. Such marks or defects may in turn cause deterioration of the uniformity of the light output.

The above process may be compared with the process of manufacturing a modified waveguide according to some embodiments. Such a process is depicted by FIG. 16D. In particular, FIG. 16D shows a simplified cross-sectional view of a mold 1670 for manufacturing a modified waveguide according to some embodiments. Mold 1670 includes a first half-mold 1680 and a second half-mold 1690.

When attached, as shown in section 1671, first half-mold 1680 and second half-mold 1690 form an internal channel with a rhombus cross section (in this case a tilted square), inside which a waveguide 1672 with a modified design may be solidified, as shown in FIG. 16D. Waveguide 1672 includes four lateral surfaces 1672a-1672d. After the solidified waveguide 1672 is formed, its four lateral surfaces are in contact with the walls of the internal channel formed by first half-mold 1680 and second half-mold 1690.

Next, to extract waveguide 1672, first half-mold 1680 and second half-mold 1690 are detached and moved apart, as shown in section 1673 of FIG. 16D. As a result, waveguide 1672 is detached from second half-mold 1690. More specifically, lateral surfaces 1672c and 1672d of the modified waveguide are fully detached from the corresponding walls of the half channel in second half-mold 1690, while lateral surfaces 1672a and 1672b remain in contact with the corresponding walls of the half channel in first half-mold 1680.

Next, a force 1675 may be applied to waveguide 1672 for detaching waveguide 1672 from first half-mold 1680. As a result of force 1675, waveguide 1672 may move to the right. At the start of this motion to the right, both lateral surfaces 1672a and 1672b are detached from the corresponding walls of the half channel in first half-mold 1680. Therefore, unlike the process of extracting waveguide 1642, described above, waveguide 1672 may not experience resistance or friction from first half-mold 1680 during this motion and, therefore, the extraction of waveguide 1672 via force 1675 may not leave marks or cause defects in waveguide 1672. Consequently, this lack of defects may further result in a better light output for the modified waveguide as compared to the non-modified waveguide.

In some embodiments the waveguide may include more than one portion, one or more of those portions shaped similar to the modified waveguides discussed above. Existence of such a portion may therefore result in the improvement in the light mixing property of the waveguide in the manner discussed above. In this disclosure, the term modified waveguide may equivalently be applied to those portions of a waveguide.

Those having ordinary skill will appreciate that various changes may be made to the above embodiments without departing from the scope of the disclosure.

Although some aspects have been described in the context of a system or an apparatus, it is clear that these aspects may also represent a description of the corresponding method, where a block or device corresponds to a method step or a feature of a method step. Analogously, aspects described in the context of a method step also represent a description of a corresponding block or item or feature of a corresponding apparatus.

The foregoing description of the embodiments has been presented for purposes of illustration only. It is not exhaustive and does not limit the embodiments to the precise form disclosed. While several exemplary embodiments and features are described, modifications, adaptations, and other implementations may be possible, without departing from the spirit and scope of the embodiments. Accordingly, unless explicitly stated otherwise, the descriptions relate to one or more embodiments and should not be construed to limit the embodiments as a whole. This is true regardless of whether or not the disclosure states that a feature is related to "a," "the," "one," "one or more," "some," or "various" embodiments. As used herein, the singular forms "a," "an," and "the" may include the plural forms unless the context clearly dictates otherwise. Further, the term "coupled" does not exclude the presence of intermediate elements between the coupled items. Also, stating that a feature may exist indicates that the feature may exist in one or more embodiments.

In this disclosure, the terms "include," "comprise," "contain," and "have," when used after a set or a system, mean an open inclusion and do not exclude addition of other, non-enumerated, members to the set or to the system. Further, unless stated otherwise or deducted otherwise from the context, the conjunction "or," if used, is not exclusive, but is instead inclusive to mean and/or.

Moreover, if these terms are used, a set may include one or more members, and a subset of a set may include one or more than one, including all, members of the set.

Further, if used in this disclosure, and unless stated or deducted otherwise, a first variable is an increasing function of a second variable if the first variable does not decrease and instead generally increases when the second variable increases. On the other hand, a first variable is a decreasing function of a second variable if the first variable does not increase and instead generally decreases when the second variable increases. In some embodiment, a first variable may be an increasing or a decreasing function of a second variable if, respectively, the first variable is directly or inversely proportional to the second variable.

The disclosed compositions, systems, methods, and apparatus are not limited to any specific aspect or feature or combinations thereof, nor do the disclosed compositions, systems, methods, and apparatus require that any one or more specific advantages be present or problems be solved. Any theories of operation are to facilitate explanation, but the disclosed compositions, systems, methods, and apparatus are not limited to such theories of operation.

Modifications and variations are possible in light of the above teachings or may be acquired from practicing the embodiments. For example, the described steps need not be performed in the same sequence discussed or with the same degree of separation. Likewise various steps may be omitted, repeated, combined, or performed in parallel, as necessary, to achieve the same or similar objectives. Similarly, the systems described need not necessarily include all parts described in the embodiments, and may also include other parts not described in the embodiments. Accordingly, the embodiments are not limited to the above-described details, but instead are defined by the appended claims in light of their full scope of equivalents. Further, the present disclosure is directed toward all novel and non-obvious features and aspects of the various disclosed embodiments, alone and in various combinations and sub-combinations with one another.

While the present disclosure has been particularly described in conjunction with specific embodiments, many alternatives, modifications, and variations will be apparent in light of the foregoing description. It is therefore contemplated that the appended claims will embrace any such alternatives, modifications, and variations as falling within the true spirit and scope of the present disclosure.

What is claimed is:

1. A light pipe, comprising:
   a curved light-guiding waveguide extending from an input surface, configured to receive light, to an output surface configured for the light to exit the curved light-guiding waveguide through the output surface;
   wherein:
   the input surface has a plurality of sides forming a polygonal shape;
   an envelope of the curved light-guiding waveguide is generated by a rotation of the input surface around a rotational axis;
   the input surface defines a base plane;
   the rotational axis is located on the base plane; and
   the rotational axis is parallel to at most one of the plurality of sides of the input surface.

2. The light pipe of claim 1, wherein the rotational axis is parallel to none of the plurality of sides of the input surface.

3. The light pipe of claim 1, wherein the rotational axis is angled at 45 degrees with respect to at least one of the plurality of sides of the input surface.

4. The light pipe of claim 1, wherein:
   two sides of the plurality of sides of the input surface are parallel; and
   the rotational axis is angled at 45 degrees with respect to the two sides of the plurality of sides.

5. The light pipe of claim 1, wherein:
   the rotation of the input surface around the rotational axis at a rotational angle forms the envelope of the curved light-guiding waveguide;
   the rotational angle is 180 degrees; and
   the input surface after the rotation overlaps the output surface.

6. The light pipe of claim 1, wherein the output surface is located on the base plane.

7. The light pipe of claim 1 wherein the rotational axis is configured with respect to the plurality of sides to reduce interference between light rays undergoing multiple reflections in the curved light-guiding waveguide.

8. The light pipe of claim 1 wherein the curved light-guiding waveguide includes a plurality of lateral surfaces extending from the input surface to the output surface and generated as an envelope of the plurality of sides.

9. The light pipe of claim 1, wherein the polygonal shape is a square.

10. The light pipe of claim 1, wherein the polygonal shape is a non-square rhombus.

11. The light pipe of claim 1, wherein the polygonal shape is a hexagon.

* * * * *